(12) United States Patent
Oledzki

(10) Patent No.: US 9,151,220 B2
(45) Date of Patent: Oct. 6, 2015

(54) ROTARY TWO-STROKE INTERNAL COMBUSTION ENGINE FUELED BY SOLID PARTICULATE

(71) Applicant: Wieslaw Julian Oledzki, Bialystok (PL)

(72) Inventor: Wieslaw Julian Oledzki, Bialystok (PL)

( * ) Notice: Subject to any disclaimer, the term of this patent is extended or adjusted under 35 U.S.C. 154(b) by 88 days.

(21) Appl. No.: 14/093,431

(22) Filed: Nov. 30, 2013

(65) Prior Publication Data

US 2015/0152781 A1 Jun. 4, 2015

(51) Int. Cl.
*F02B 53/10* (2006.01)
*F02B 53/02* (2006.01)

(52) U.S. Cl.
CPC ........................................ *F02B 53/02* (2013.01)

(58) Field of Classification Search
CPC ............ F02B 52/00; F02B 55/14; F01C 1/24; F01C 19/00; F01C 21/007
USPC ............... 123/204–209, 664, 668; 418/36, 37
See application file for complete search history.

(56) References Cited

U.S. PATENT DOCUMENTS

| | | | | |
|---|---|---|---|---|
| 3,464,395 A * | 9/1969 | Kelly | ............................ | 123/243 |
| 4,052,963 A * | 10/1977 | Steiger | ............................ | 123/23 |
| 4,056,080 A * | 11/1977 | Rutz et al. | ....................... | 123/23 |
| 4,070,996 A * | 1/1978 | Steiger | ............................ | 123/23 |
| 4,070,997 A * | 1/1978 | Steiger | ............................ | 123/23 |
| 4,086,883 A * | 5/1978 | Steiger | ............................ | 123/23 |
| 5,816,788 A * | 10/1998 | Yakirevich | ....................... | 418/36 |
| 6,164,263 A * | 12/2000 | Saint-Hilaire et al. | ......... | 123/241 |
| 6,325,038 B1 * | 12/2001 | Millett | ............................ | 123/241 |
| 6,899,075 B2 * | 5/2005 | Saint-Hilaire et al. | ......... | 123/241 |
| 2010/0251991 A1 * | 10/2010 | Drachko | ........................ | 123/221 |
| 2014/0352654 A1 * | 12/2014 | Saba | ............................. | 123/200 |

\* cited by examiner

*Primary Examiner* — William Gilbert

(57) ABSTRACT

Rotary positive displacement internal combustion two stroke engine with only one major moving part, i.e. engine's eccentric shaft, with cylinders encompassing eccentrics of the shaft, with said eccentrics being suitably sealed in said cylinders, wherein combustion gases exert force directly on said eccentrics of said eccentric shaft. Gas forces can be nullified by suitably phasing shaft's eccentrics, thus nullifying gas forces loading shaft's bearings. The engine is naturally perfectly balanced. The engine possesses natural self-cleaning capability, and is capable of being fueled by coal dust. Units of the type developing 2 000 MW and 3 000-3 6000 rev/min, intended to replace steam turbines in power stations, can be built.

11 Claims, 24 Drawing Sheets

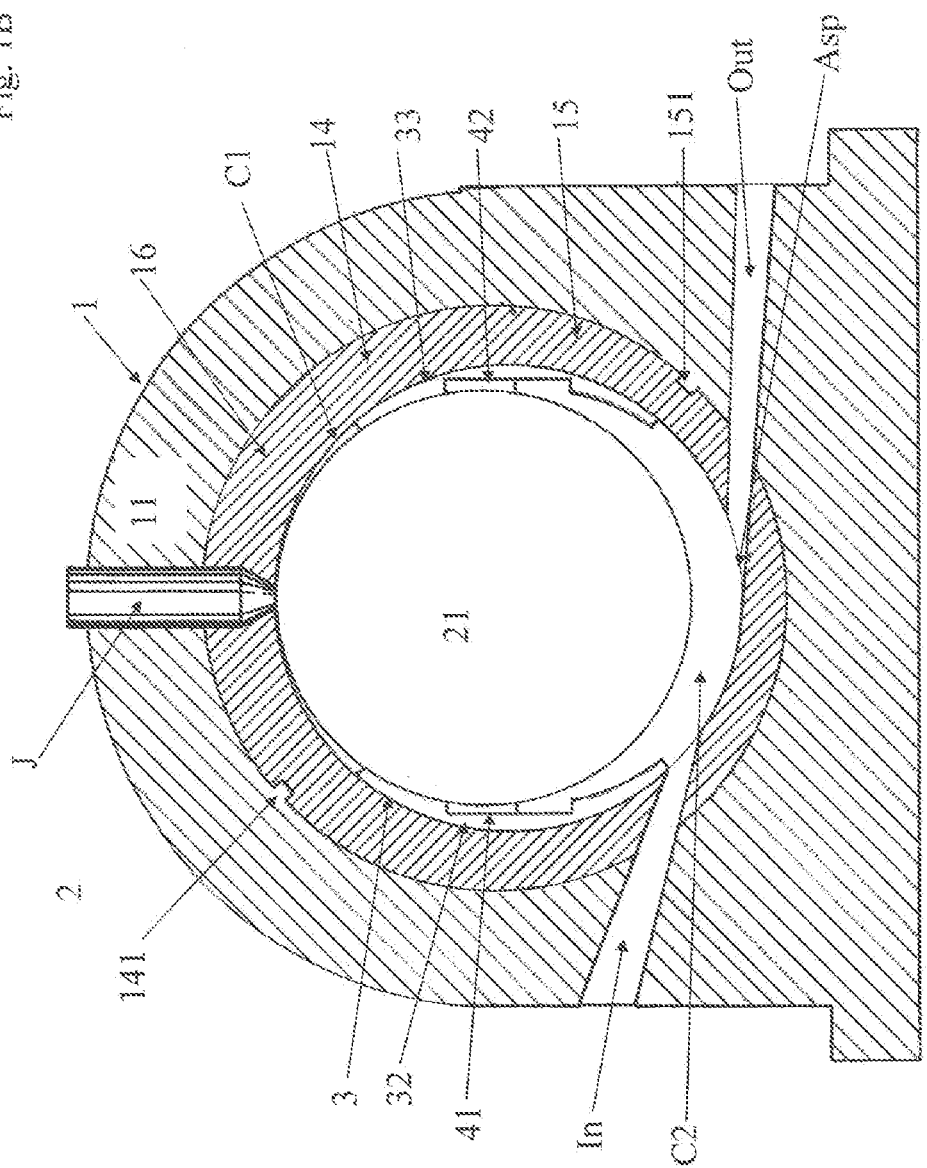

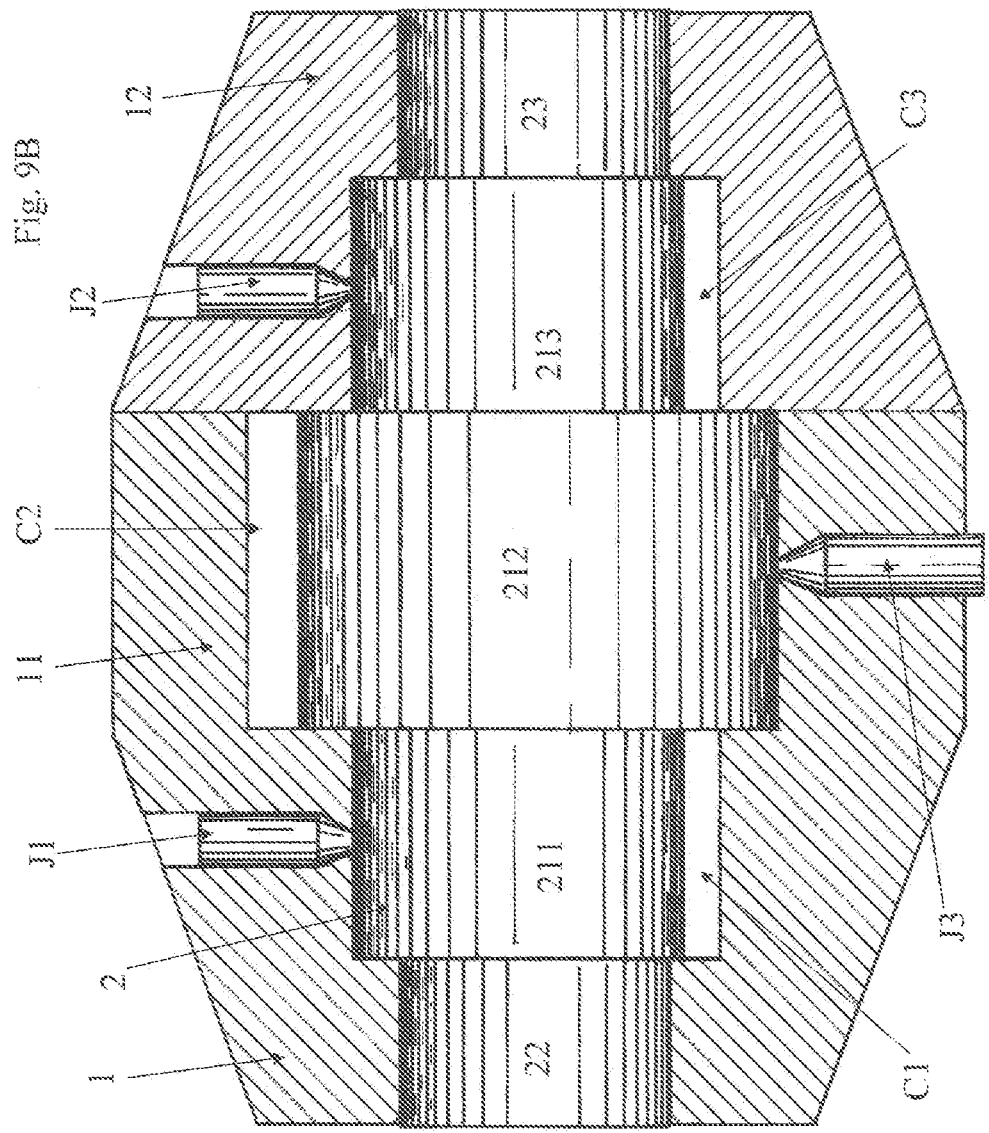

ROTARY TWO-STROKE INTERNAL COMBUSTION ENGINE FUELED BY SOLID PARTICULATE

TECHNICAL FIELD OF THE INVENTION

The invention relates to heat engines and, more specifically, to positive displacement internal combustion engines, and is particularly concerned with very large rotary internal combustion engines fueled by solid particulate fuels like coal dust, destined to drive electric current generators, and intended to replace large steam turbines offering at least 50% overall efficiency in comparison with ~40% overall efficiency of typical steam boiler-steam turbine assembly. Thus the invention solves the problem of building very large internal combustion positive displacement engines capable of revolving with very large rotational speeds (e.g. 3000-3600 rev./min, like steam turbines) and developing very large outputs (2000 MW and more), as well as problems of fueling internal combustion engines by solid particulate fuels, and removing unburned solid residues from combustion chamber of internal combustion engine. The invention provides the optimal form for the two stroke rotary engine of unique simplicity, strength and compactness, and sealing as simple and robust as that of the ordinary piston engine.

STATE OF THE ART AND BACKGROUND OF THE INVENTION

Existing successful heat engines are steam turbines, gas turbines and positive displacement engines (reciprocating piston and rotary Wankel) utilizing various thermodynamic cycles (Diesel (or rather Sabathe), Otto and Stirling cycle). These engines, although now having been developed for more than century (almost 2 centuries in the case of Stirling), still stop short from fulfilling the requirements imposed on prime movers by modern economy. Thus steam turbines require huge steam boilers and steam condensers and are troublesome to exploit, therefore their applications are restricted to power plants and propulsion of ships and some other heavy machinery. Moreover the overall efficiency of steam turbine power plants is significantly inferior to that of large Diesel engines. Most important advantage of steam turbines over other known heat engines is their ability to cope with large outputs, approximately 2 000 MW in largest units, i.e. 25 times the output of largest reciprocating engines. Another important advantage of power plants utilizing steam turbines is their multi-fuel capability.

Gas turbines, thermal efficiency of which can achieve even 55% in large units destined for power generation and industrial applications (which in fact are compound heat machines with large heat exchanger), usually, particularly in small units, display much poorer figure than positive displacement engines, are more complicated technologically and more expensive, and therefore are unlikely to earn as dominant position as Diesels enjoy today due to these and other well-known inherent drawbacks and limitations. Moreover, gas turbines require high quality, expensive fuels, and their ability to accept cheap solid particulate fuels (mainly pulverized coal) is problematic, due to unacceptably low durability of turbine's blades coming in contact with unburned hard solid particulates produced by burning pulverized coal.

Thus positive displacement engines still have important advantages over turbines that render them irreplaceable for most applications.

Most common positive displacement engine in use (and in fact most common heat engine), Diesel engine, achieves maximum overall efficiency of slightly beyond 50% (large stationary or marine units, which again are compound heat machines comprising Diesel engine, turbocharger, supercharging air cooler and auxiliary power turbine), and average Diesel efficiency is merely ~40%, a poor figure in comparison with 70-75% originally assumed by its inventor in late $19^{th}$ century. Thermal efficiency of Diesel cycle rises with the compression ratio, but this method for improving overall efficiency of real Diesel engines is negated by friction loses generated by various engine's kinetic couples loaded with the gas force (piston-connecting rod, crosshead-slider, connecting rod-crankshaft, crankshaft-engine's body) rapidly rising with loads of engine's mechanism. Moreover, conventional connecting rod—crank mechanism's strength becomes a concern in highly loaded Diesel engines.

Another well-known positive displacement heat engine is the (external combustion) Stirling engine. This engine is closest to the ideal Carnot engine in terms of thermal efficiency, and another important advantage over known internal combustion engines is its capability to utilize various sources of thermal energy. However, Stirling engine is expensive to manufacture and troublesome to maintain, and this renders it considerably inferior to internal combustion engine in most applications, and prevents from earning wide acceptance. Moreover, Stirling engine shares with diesels main disadvantages of reciprocating engines mentioned above.

There are many non-conventional designs of heat engines (most of them focusing on transforming gas force into driving torque of rotating shaft), e.g. rotary engines like Wankel, recently patented quasi turbine (see U.S. Pat. Nos. 6,164,263 and 6,899,075), spherical engines (see U.S. Pat. Nos. 6,325, 038, and 6,941,900, and Russian patent 2,227,211) and oscillating pivotal engine (see www.PivotalEngine.com). However, so far none of those non-conventional engines, with Wankel-type engine being the only exception of economically (but certainly not conceptually) marginal importance, was successful, and probably none of them includes any chance to even go beyond the stage of prototyping. Technically, this is due to the fact that the answer to the principal question any new engine is obliged to answer: "Does the new engine do its work better than conventional one?" is decidedly negative for all those non-conventional designs, including Wankel's. Even the answer to the more general question: "Does the new engine do its work in any aspect better than conventional one?" is negative for almost all non-conventional engines. (In the case of the Wankel engine, the answer to this more general question is positive, but superiority of Wankel over conventional engines in certain aspects (great power/weight and power/volume ratios, kinetic simplicity and smoothness of operation) is overshadowed by its inherent drawbacks (weak structure, inability to cope with large outputs, inferior efficiency, weakness of sealing, inherent inability to incorporate high compression ratios and to cope with large outputs)). Conceptually, this is mainly due to the fact that those new engine designs (e.g. quasi turbine) focus on certain isolated aspects of heat engine while ignoring some other aspects (e.g. sealing, mechanical strength and reliability).

For example, recently patented positive displacement rotary engine, quasi-turbine, is complex both kinetically and structurally, its moving elements of complicated shapes are likely to be subjected to excessive thermal stresses and renders the engine weak structurally and more difficult to seal than Wankel engine; thus the engine is unlikely to do well the job of heat engine (it would be better as pump or compressor). Some other rotary engines (e.g. satellite engine, see publication WO9618024) use toothed wheels to transfer the pistons movement to rotary motion of engine's shaft. This not only makes these engines complex but also unreliable, as engine's elements that meet along a line are not well suited to bear shock loads met with in internal combustion engines.

Fuel cell is a very promising source of power for many applications, but it seems improbable it will become appropriate for applications where high power density and large power are essential in any foreseeable future.

Electricity is most often generated by electromechanical generators, primarily driven by heat engines fueled by combustible fuels like coal dust, or nuclear fission, but also by other means such as water turbines utilizing kinetic energy of flowing water. Capability of achieving large powers (250-2000 MW), revolving very fast (3000-3600 rev/min) to be able to directly (i.e. without the necessity of being augmented by large multiplication gears, which would be impractical if not impossible) drive generators, and capability of being fueled by cheap solid fuels like coal dust, are well known to be essential requirements for heat engines destined for applications in power plants. By now only steam turbines or closed cycle turbines (e.g. utilizing helium as a motive fluid) are capable of fulfilling these requirements. Contemporary reciprocating internal combustion engines are well known to hardly accept fueling by coal dust due to unacceptably rapid wear of engine's moving parts caused by unburned solid hard particulates produced by combustion of such fuel (some attempts have been made to fuel reciprocating internal combustion engines by coal dust (see for example U.S. Pat. Nos. 4,052,963, 4,056,080, 4,070,996, 4,070,997, 4,086,883, all assigned to Sulzer Bros. Ltd.), but, up to my knowledge, none of these attempts was a success; to be more specific, the problem of fueling Diesel engine by coal dust is only partially solved: the problem of supplying coal dust to engine's cylinder in precisely metered portions seems to be satisfactorily solved, while removing unburned solid particulates from engine's cylinder is still a serious challenge).

Moreover maximum power achieved by reciprocating engines is approximately 80-87 MW (Wartsila-Sulzer RTA96-C or largest MAN-B&W 14-cylinder engines weighing ~2300 metric tons), and largest reciprocating engines are not capable to revolve faster than approximately 100 rev/min due to large inertia mass forces generated by heavy reciprocating engine's parts (piston, piston rod, crosshead, and connecting rod, total weight of which amounts to tens of tons multiplied by the number of engine's cylinders), poor figures in comparison with steam turbines; all these drawbacks render reciprocating internal combustion engines impractical as far as large scale power generation is concerned. Note, that increasing rotational speed of the RTA96 engine mentioned above to 3000 rev/min would increase its output to more than 2500 MW, a goal that obviously cannot be achieved due to at least 30-fold increase of mass forces that would inevitably have destroyed the engine (of course there are also other well known obstacles).

Thus there is a need for highly efficient internal combustion engine capable of being fueled by coal dust (which is the cheapest combustible fuel), and capable of developing very large power comparable to largest steam turbines, while revolving at 3000-3600 revolutions per minute.

It is to be stressed that none of the non-conventional engine designs in United States Patent and Trademark Office (USPTO) and European Patent Office (EPO) patent data bases offers satisfactory mechanical structure of the ICE suitable for coping with extreme large power and high rotary speed while assuring engine's compactness and good sealing.

Moreover, none of the known positive-displacement internal combustion engines approaches highly desirable kinetic simplicity of gas turbines.

SUMMARY OF THE INVENTION

Thus the principal objective of the present invention is to provide a high power density positive-displacement internal combustion engine of simple and extraordinarily robust structure, with no reciprocating parts generating large mass forces and thus capable to revolve very fast, capable to develop large power comparable to largest steam turbines, capable to withstand extremely high loads and thus capable to work on highly efficient ultra-high pressure Diesel cycle or HCCI or detonation cycles without increasing specific loads of engine's elements beyond limits typical for ordinary piston engines, and without decreasing mechanical efficiency of the engine.

It is another principal objective of the invention to provide an internal combustion engine capable of being fueled by solid particulate fuels like coal dust while retaining very high reliability and durability of the engine.

Another objective of the invention is to provide a structure for a valve-less two stroke engine that guarantees good constraint for engine's piston and piston sealing elements.

Yet another objective of the invention is to provide a compact structure of the internal combustion engine with no hot load bearing sliding elements.

A further objective of the invention is to provide a structure of the internal combustion engine that allows for nullifying gas forces loading engine's bearings.

Another objective of the invention is to substantially increase thermal efficiency of engines by increasing such parameters as maximum combustion pressure without increasing specific loads of engine's parts and increasing friction losses.

Yet another objective of the invention is to provide a structure for positive displacement engines that offers substantial improvement of such important engine parameters as swept volume/total volume, power/total volume and power/weight ratio, without increasing specific loads and thus without sacrificing engine's strength and reliability.

Another objective of the invention is to provide a rotary engine that includes sealing as simple, tight and reliable as conventional piston engines and much simpler, tighter and much more reliable than conventional (Wankel, vane, etc.) rotary engines.

Yet another objective is to provide a valve-less rotary engine that embodies in a natural way the Atkinson/Miller cycle, i.e. which includes a natural overexpansion capability.

Another objective of the invention is to substantially simplify technology of internal combustion engines by providing an internal combustion engine all parts of which have extremely simple structure.

More specifically, the objective of the invention is to provide a proper structure of rotary positive displacement engine having some specific qualities of gas and steam turbines, namely high power density and capability to give very large output, kinetic simplicity combined with good driving torque smoothness, absence of radial loads loading engine's shaft and bearings, having scavenging system that makes the gas flow almost as smooth as (and similar to) that to be found in gas turbines, and assuring engine's perfect balance thus enabling it to rotate at high speeds.

These and other goals are achieved according to the invention by providing a rotary engine, which comprises only one principal moving part, namely engine's crankshaft (or rather eccentric shaft), which contains no parts executing reciprocating motion like pistons, crossheads, or connecting rods, thus being naturally perfectly balanced and capable of achieving high rotational speeds, wherein high-pressure combustion gases exert force directly upon suitably sealed eccentrics of the eccentric shaft thus avoiding transferring gas force to the engine shaft through multiple kinetic couples (like rotors in Wankel engine) causing friction loses, wherein said rotary engine possesses self-cleaning capability, i.e. natural capability to expel unburned particulates out of combustion chambers, wherein sealing of said rotary engine is subjected only to rotational friction (i.e. contains no couples subjected to sliding friction, as in conventional positive displacement engines), thus assuring satisfactory durability of engine's elements remaining in contact during its operation with high rotational speed.

BRIEF DESCRIPTION OF THE DRAWINGS

FIG. 1B is a transverse cross-section taken at a line A-A (see FIG. 6) of an engine utilizing uniflow scavenging being a variant of the first preferred embodiment of the invention.

FIG. 9B is a longitudinal cross-section of an engine being a variant of the second preferred embodiment of the present invention.

Like engine's parts are indicated by like characters throughout the specification and the drawings.

DETAILED DESCRIPTION OF PREFERRED EMBODIMENTS

Figure 22:
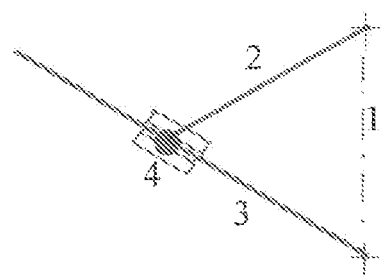
FIG. 22 is a kinetic scheme of the assembly of a body, the shaft and the sealing elements of the engine according to the present invention.

The engine being the first preferred embodiment of the invention (see FIGS. 1-8, 10, 22) consists of only two principal parts, namely a body 1 and an eccentric shaft 2 rotatably mounted in the body 1, wherein an eccentric of said eccentric shaft 2 is suitably sealed in the body 1 with the help of the primary sealing element 3 and secondary sealing elements 41, 42. The assembly of the body 1, the shaft 2, and the primary 3 and secondary sealing elements 41, 42 forms a 4-bar mechanism illustrated in FIG. 22, wherein the body 1, the shaft 2, the sealing element 3 and the sealing elements 41 and 42 correspond to elements 1, 2, 3, and 4 of said mechanism respectively (wherein the secondary sealing elements 41 and 42 move in unison and both correspond to the element 4 shown in the kinetic scheme in FIG. 22). Thus, from the kinetic point of view, the assembly of the body 1, the shaft 2, the primary sealing element 3, and the secondary sealing elements 41, 42, represents a four bar mechanism having three rotary kinetic couples (1;2), (1;3), (2;4)=(2;41+42) (defining three axes of rotation: an axis O1 (the axis of rotation of the shaft 2 relative the body 1), an axis O2 (the axis of rotation of the primary sealing element 3 relative the body 1), and an axis O3 (the axis of rotation of the secondary elements 41 and 42 relative the shaft 2), respectively), and one sliding kinetic couple (3;4)=(3;41+42). All the axes of rotation O1, O2, and O3 are mutually parallel. A distance d between the axis O1 of rotation of the shaft 2 relative the body 1 and the axis O2 of rotation of the primary sealing element 3 relative the body 1 equals the eccentricity ratio D of the eccentric shaft 2 (see FIG. 22). Thus, when the shaft 2 rotates relative the body 1 in one direction with the rotational speed Ω, then the primary sealing element 3 rotates relative the body 1 with the rotational speed ½Ω (in the same direction), and both the secondary sealing elements 41, 42 (i.e. the element 4 in FIG. 22) rotate relative the shaft 2 with the rotational speed −½Ω (in the opposite direction).

Figure 1A:
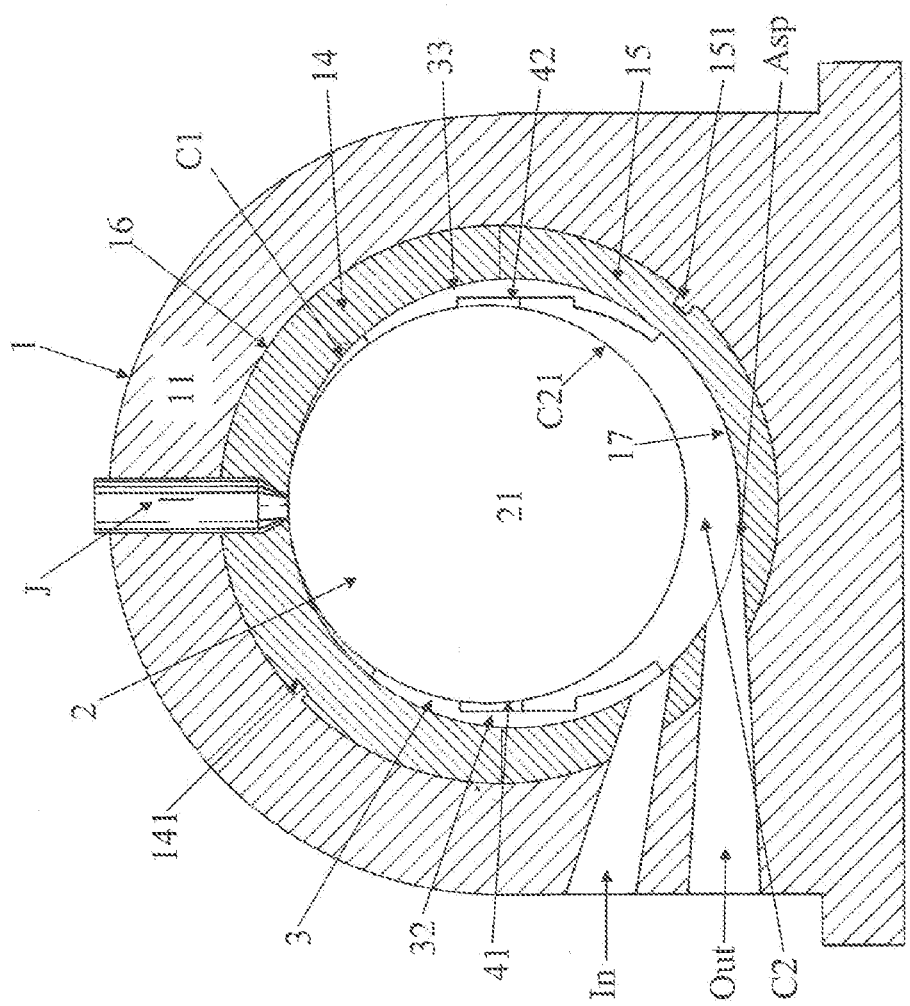
FIG. 1A is a transverse cross-section taken at a line A-A (see FIG. 6) of an engine utilizing loop scavenging being a first preferred embodiment of the invention.
Figure 2:
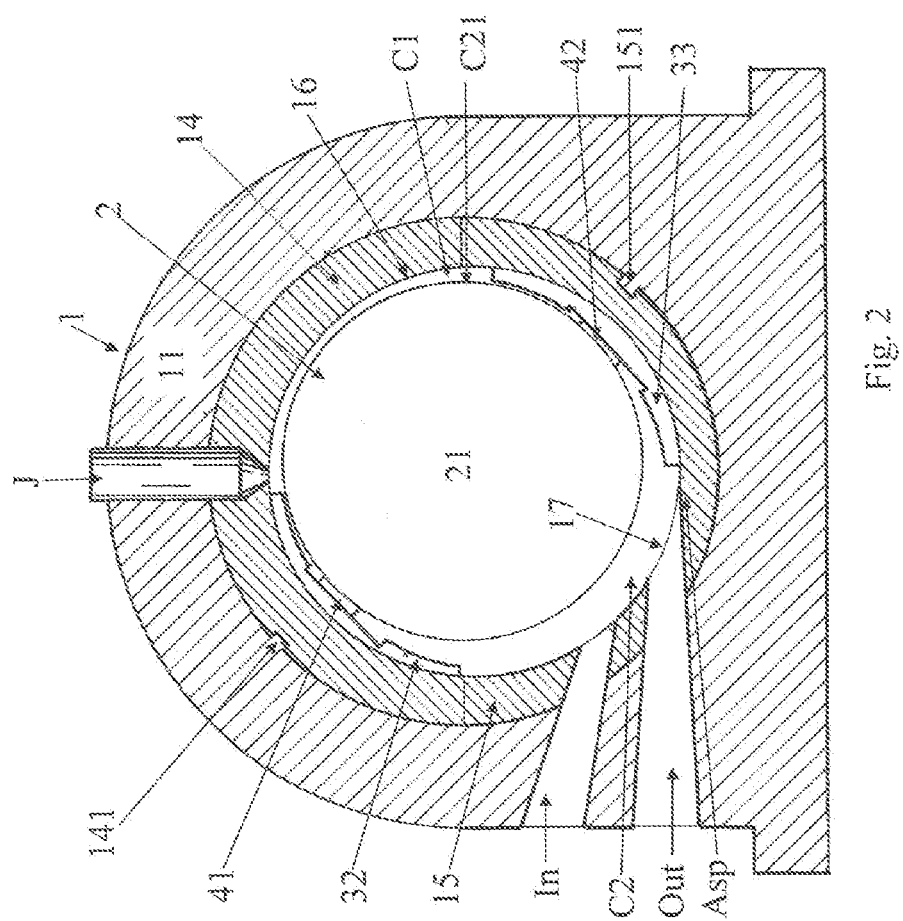
FIG. 2 is another transverse cross-section taken at a line A-A (see FIG. 6) of the engine being the first preferred embodiment of the invention, showing positions of the engine parts at some other stage of work cycle.

The engine body 1 consists of five parts: a primary central part 11 accommodating engine's combustion chambers, a first side part 12, and a second side part 13, and two secondary central parts 14, 15 bounding engine's combustion chambers. The primary central part 11 includes a circular chamber 16 forming bearings 18 and 19 of the shaft 2, and accommodating the secondary central parts 14, 15, wherein the longitudinal axis of symmetry of said circular chamber coincides with the axis of rotation of the shaft 2 relative the body 1. Each of the two secondary central parts 14 and 15 of the body 1 assumes the general form of half-ring and, when put together and assembled in the primary central part 11 of the body, the central parts 14, 15 form a ring, an inner cylindrical surface 17 of which is placed eccentrically relative an outer cylindrical surface of said ring, wherein the eccentricity ratio equals the eccentricity ratio D of the shaft 2, and the distance d between the axis of rotation of the shaft 2 relative the body 1 and the axis of rotation of the primary sealing element 3 relative the body 1. The secondary body central parts 14 and 15 are secured against rotation in the primary body central part 11 with the help of projections 141 and 151 respectively. The secondary body central parts 14 and 15 form a cylinder 17 of the engine. Extending through the primary body central part 11 and the secondary body central part 15 there are inlet ports In and outlet ports Out; inlet ports In are suitably pincludesed relative the outlet ports Out so as the engine operates on an Atkinson cycle of a predetermined overexpansion ratio. Various mutual arrangement of inlet and outlet ports determines the type of scavenging utilized by the engine, namely the loop scavenging (FIG. 1A), or uniflow scavenging (FIG. 1B). Placed at the bottom of the secondary body central part 15 there is an ashpan Asp intended to collect unburned solid particles. Placed in the primary body central part 11 there is a fuel injector J e.g. of the type described in U.S. Pat. Nos. 4,052,963, 4,056,080, 4,070,996, 4,070,997, 4,086,883, driven by any type of conventional drive-train (not shown). The two side body parts 12 and 13 close the primary body central part 11 at both ends.

The shaft 2 (see FIGS. 7, 8) consists of an eccentric 21, and two massive pins 22 and 23. Each pin of said two pins 22 and 23 includes a circular hollow placed eccentrically relative its external circular surface, wherein the eccentricity ratio equals the eccentricity ratio D of the shaft 2. The eccentric 21 and the pins 22 and 23 are put together to form the eccentric shaft 2 by mounting one end of the eccentric 21 in the eccentric hollow of the pin 22 and the other end of the eccentric 21 in the eccentric hollow of the pin 23 e.g. by shrinkage mounting. Eccentric 21 includes cooling medium axial conveyances 211, which are in a fluidic communication with cooling medium radial conveyances 221 and 231 placed in the pins 22 and 231 respectively. The pins 22 and 23 of the shaft 2 pivot in the bearings 18 and 19 respectively, placed in the primary body central part 11, while the eccentric 21 is placed inside the cylinder 17 formed by the secondary body central parts 14 and 15; thus the shaft 2 and the body 1 form the rotary kinetic couple (1;2)

The primary sealing element 3 assumes the form of a circular ring 31 with two crescent-shaped elements 32 and 33 attached thereto. The crescent-shaped element 32 includes a flat surface F32; similarly, the crescent-shaped element 33 includes a flat surface F33. The primary sealing element 3 is mounted rotatably in the cylinder 17 formed by the secondary body central elements 14 and 15 to form with the body 1 the rotary kinetic couple (1;3).

The first 41 and the second 42 secondary sealing element includes a flat surface F41 and F42, and a circular surface C41 and C42 respectively, wherein radii of the circular surfaces C41 and C42 equals the radius of the circular surface C21 of the eccentric 21 of the shaft 2. The flat surface F41 of the first secondary sealing element 41 slides over the flat surface F32 of the first crescent-shaped element 32 of the primary sealing element 3. Similarly, the flat surface F42 of the second secondary sealing element 42 slides over the flat surface F33 of the second crescent-shaped element 33 of the primary sealing element 3; thus the first 41 and the second 42 secondary sealing elements form with the primary sealing element 3 the sliding kinetic couple (3;4)=(3;41+42), as explained above.

The circular surface C41 of the first secondary sealing element 41 slides over the circular surface C21 of the eccentric 21 of the shaft 2. Similarly, the circular surface C42 of the second secondary sealing element 42 slides over the circular surface C21 of the eccentric 21 of the shaft 2; thus the shaft 2 and the first 41 and the second 42 secondary sealing elements form the rotary kinetic couple (2;4)=(2;41+42), as explained above.

The contact surface of side walls of the shaft pins 22, 23 and walls of the engine cylinder 17 also must be sealed, and labyrinth sealing (not shown) is adequate for this purpose.

The cylinder 17 formed by the secondary body central parts 14 and 15, circular surface C21 of the eccentric 21 of the shaft 2, the flat surfaces F22 and F23 of the pins 22 and 23 of the shaft 2, and the primary 3 and secondary 41, 42 sealing elements bound two variable volume combustion chambers C1 and C2.

Figure 9A:
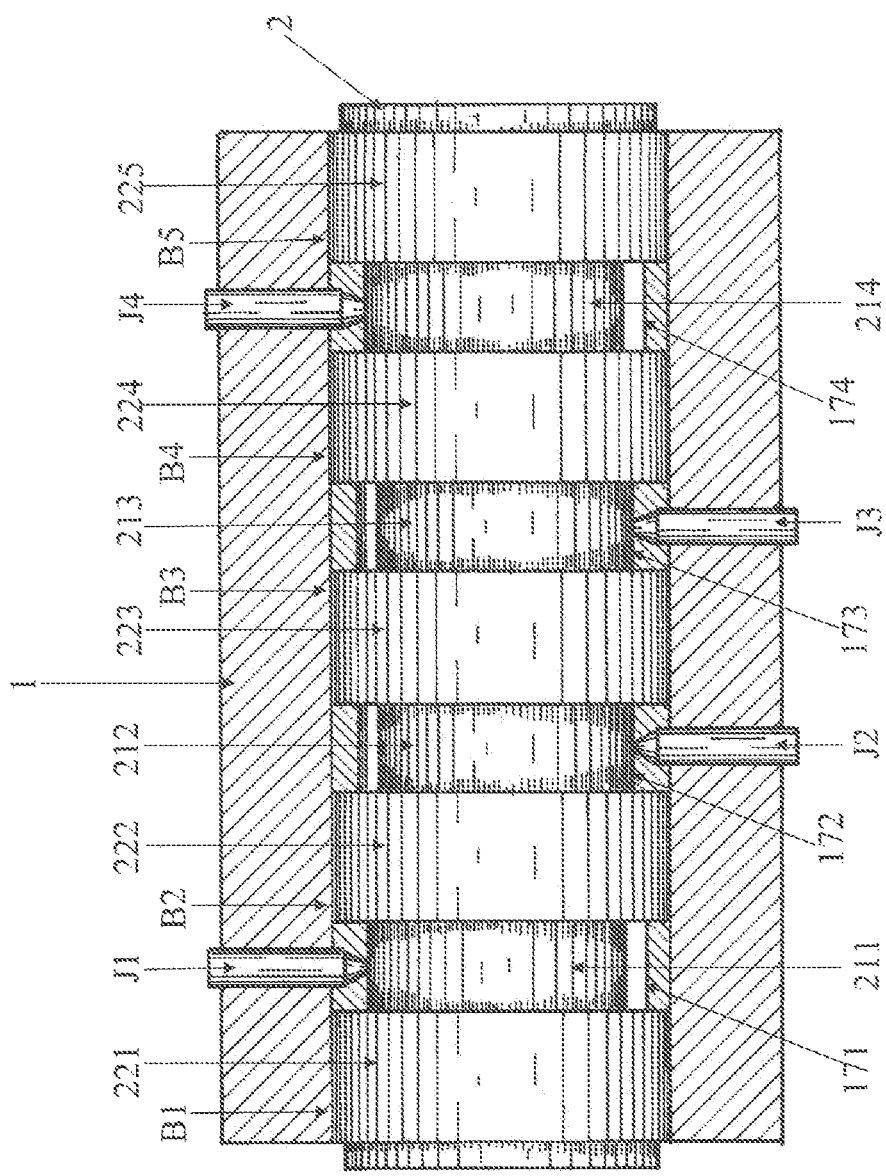
FIG. 9A is a longitudinal cross-section of an engine being a second preferred embodiment of the present invention.
Figure 10:
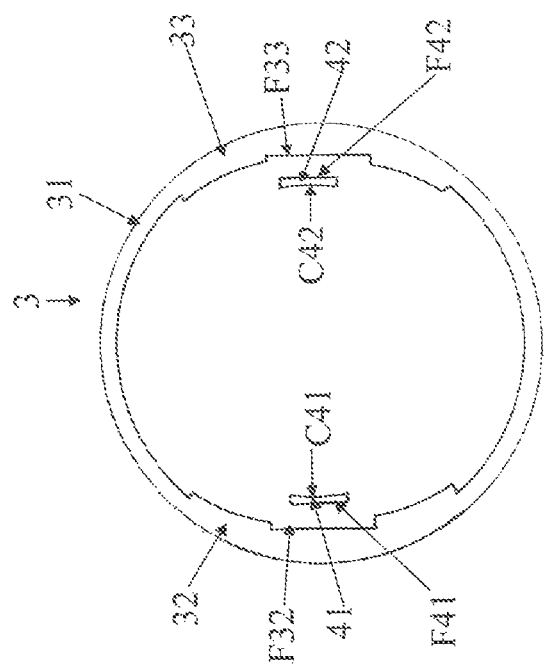
FIG. 10 is a view of sealing elements of both the first and the second engines being the first and the second preferred embodiments of the invention respectively.

Another engine embodying the present invention is shown in a longitudinal cross-section in FIG. 9A. It shares transverse cross-sections with the engine described above as the engine is a multiple of the previous one. The principal idea behind this design is to nullify the resultant gas force, mass forces and moments of gas and mass forces loading the engine shaft, in order to minimize bearings loads and therefore friction loses.

The engine includes a body 1 and a shaft 2. The body 1 includes five coaxial bearings B1, B2, B3, B4, and B5, and four cylinders 171, 172, 173, and 174 each formed by secondary body central elements in the manner identical to that described above. The central cylinders 172 and 173 have a common symmetry axis parallel to the axis of symmetry of bearings B1, B2, B3, B4, and B5, and displaced relative the axis of symmetry of said bearings B1, B2, B3, B4, and B5 by a distance d. Similarly, the extreme cylinders 171 and 174 have a common symmetry axis parallel to the axis of symmetry of bearings B1, B2, B3, B4, and B5, and displaced relative the axis of symmetry of said bearings B1, B2, B3, B4, and B5 by a distance d, and pincludesed relative the axis of symmetry of the central cylinders 172 and 173 by 180°.

The shaft 2 includes four eccentrics 211, 212, 213, and 214, and five coaxial pins 221, 222, 223, 224, and 225. Two central eccentrics 212 and 213 have a common longitudinal axis of symmetry parallel to the common axis of symmetry of the pins 221, 222, 223, 224, and 225, and displaced relative said axis of symmetry of the pins 221, 222, 223, 224, and 225 by the distance d; similarly, two extreme eccentrics 211 and 214 have a common longitudinal axis of symmetry parallel to the common axis of symmetry of the pins 221, 222, 223, 224, and 225, and displaced relative said axis of symmetry of the pins 221, 222, 223, 224, and 225 by the distance d. The two central eccentrics 212 and 213 are pincludesed relative the two extreme eccentrics 211 and 214 by 180°.

The eccentrics 211, 212, 213, and 214 of the shaft 2 are sealed inside the cylinders C1, C2, C3, and C4 respectively in the manner identical to that of the sealing of the eccentric 21 of the shaft 2 in the cylinder 17 of the previously described engine, using primary and secondary sealing elements, as described above.

Thanks to the above-described pincludesing of the eccentrics 211, 212, 213, and 214, and cylinders C1, C2, C3, and C4, the engine is naturally dynamically balanced (i.e. the mass forces and moments of gas forces are nullified), and the resultant gas force and as moment of gas force loading the shaft 2 equal zero. Consequently, the friction losses in this engine are almost nullified, and the engine is exceptionally well suited to work on highly efficient thermodynamic cycles which utilizes very high compression ratios and very high maximum in-cylinder gas pressures.

Another engine being a variant of the second preferred embodiment of the invention is shown in a longitudinal cross section in FIG. 9B. Again the engine is perfectly dynamically balanced and the resultant gas force acting upon the engine shaft is nullified thanks to suitably chosen dimensions, masses, and eccentricity ratios of three shaft's eccentrics, where the central eccentric is longer and includes larger diameter that two side eccentrics. However, the engine shaft three eccentrics are not separated by main journals and the main journals of the shaft have smaller diameter than the eccentrics in order to minimize engines overall dimensions and in-bearing friction losses. Applying only two relatively small main journals supporting the engine shaft at its both ends is acceptable as the main journals are not loaded by mass and gas forces, and the shaft is very rigid. Thus the engine includes a body 1 composed of two parts 11 and 12, and a shaft 2. The shaft includes main pins 22 and 23 placed at both its ends and three eccentrics 211, 212, and 213, The eccentrics 211, 212, 213 are sealed in their respective cylinders C1, C2, C3 using the primary and secondary sealing elements (not visible in FIG. 9B), as described above. Mounted in the engine body 1 are three fuel injectors J1, J2, J3.

Figure 11:
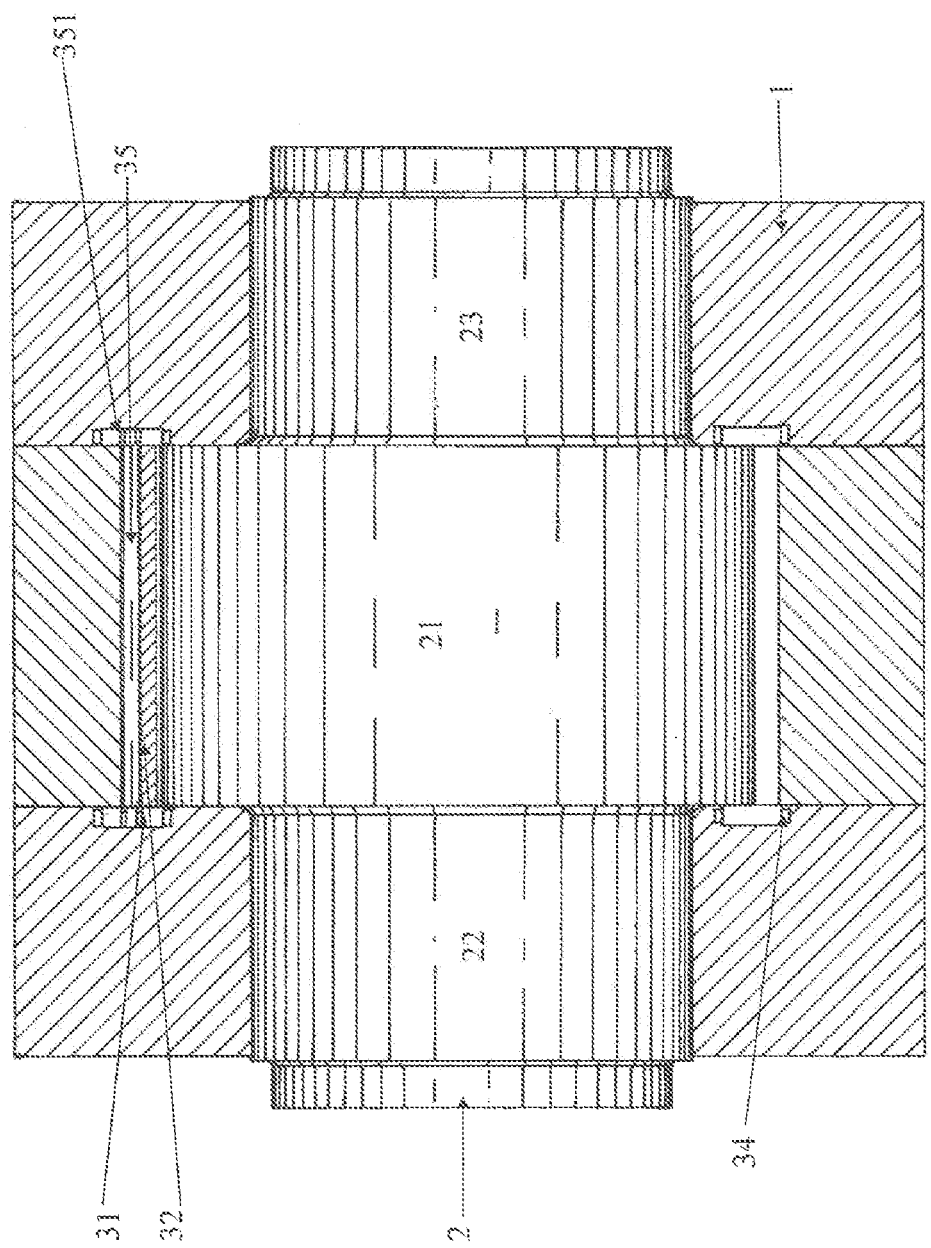
FIG. 11 is a longitudinal cross-section of a third preferred embodiment of the invention.
Figure 12:
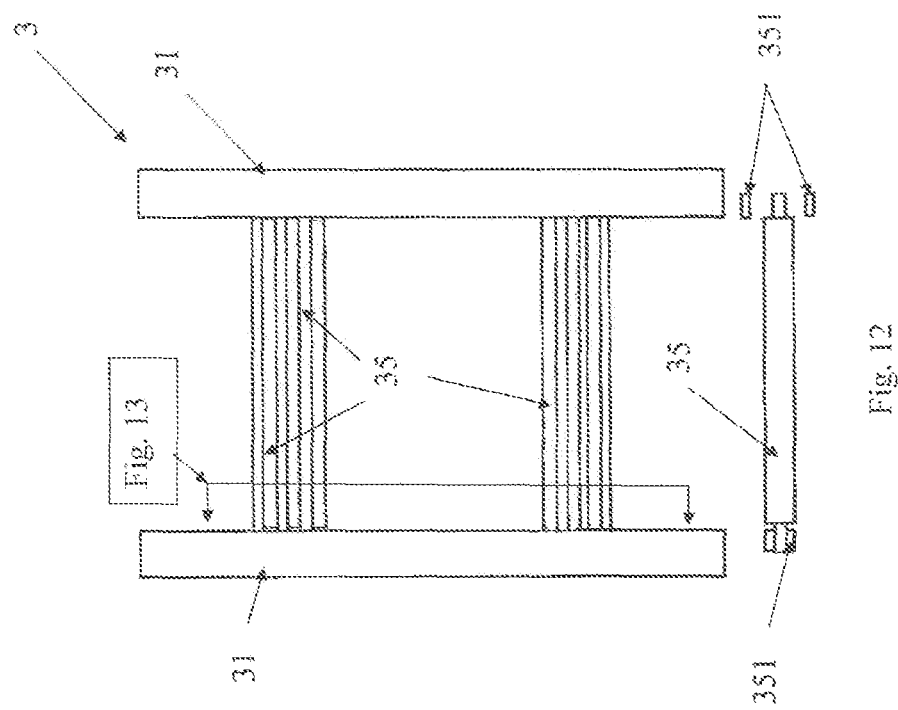
FIG. 12 is another view of sealing elements of the third engine being the third preferred embodiment of the invention.
Figure 13:
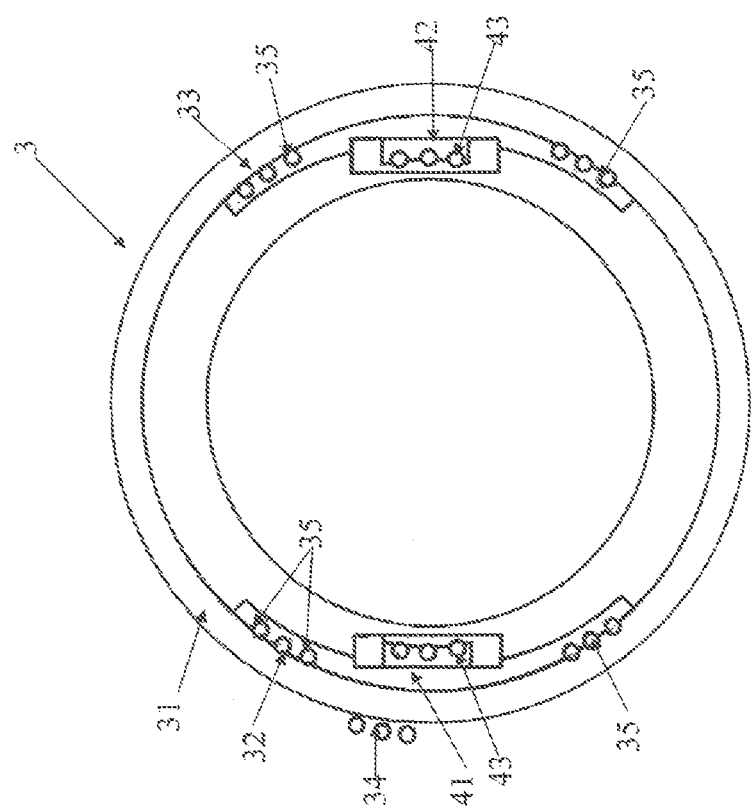
FIG. 13 is a view, partially in cross-section, indicated by a broken arrow in FIG. 12 of the sealing elements of the third engine being the third preferred embodiment of the invention.

FIGS. 11-13 illustrate yet another engine, intentionally a very large engine rotating with a large rotational speed intended to drive electric current generator, being another preferred embodiment of the invention. It differs from the engines described above in that the main shaft pins 22 and 23 have smaller diameter than the eccentric 21. Moreover sealing of this engine is slightly different that those of the previously described engines, which is the most essential difference (see FIGS. 11-13, and particularly FIGS. 12, 12). Namely, as the diameter of the engine cylinder and eccentric 21 of the eccentric shaft 2 have very large diameter, and speed of the primary sealing element 3 relative the engine cylinder and speed of the secondary sealing elements 41, 42 relative the eccentric 21 are very large, the sealing of the engine is constructed so as no sliding friction occurs between the engine cylinder and shaft eccentric 21 and sealing elements 3 and 4, in order to prevent unacceptably quick wear of these elements. To be more precise, sealing rollers 35 are mounted rotatably in the rings 31 of the primary sealing element 3 using roller bearings 351, and the whole primary sealing element 3 is mounted rotatably in the engine body 1 using large diameter roller bearings 34. Moreover, the secondary sealing elements 41, 42 are equipped with sealing rollers 43 rotatably mounted in roller bearings (not shown) in the elements 41, 42. During operation of the engine sealing rollers 35 roll over the inner cylindrical surface of the engine cylinder, while the rollers 43 roll over the cylindrical surface of the eccentric 21.

Figure 14:
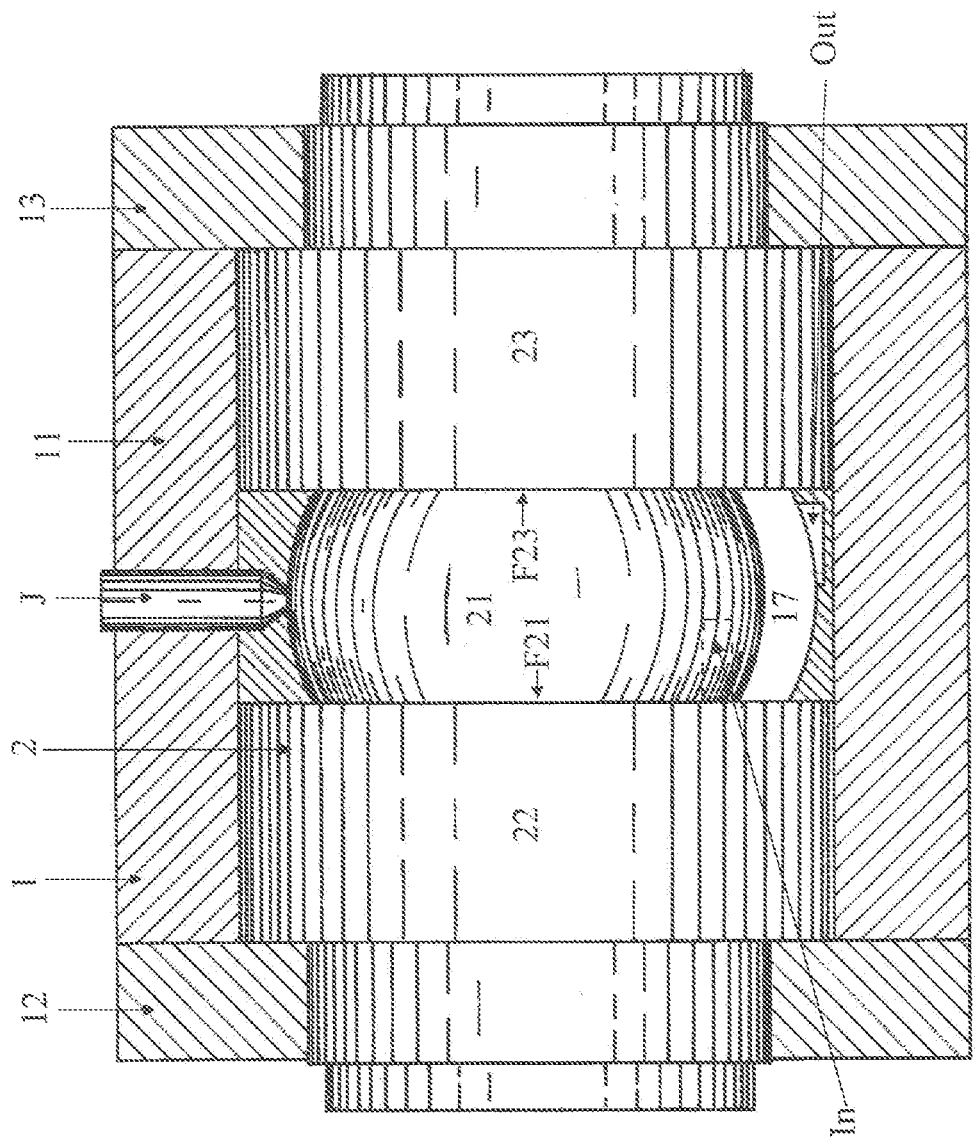
FIG. 14 is a longitudinal cross-section of yet another preferred embodiment of the invention

The design illustrated in FIG. 14 (which shares the transverse cross-section with the previously-described engines) addresses the problem of generating air swirl in the combustion chamber required in Diesel-cycle engines to enhance mixing of air and fuel. Thus the engine includes a substantially spherical cylinder 17, the engine shaft 2 includes substantially spherical eccentric 21, and the inlet In (marked in FIG. 14 with broken line) and outlet Out ports are placed in different planes perpendicular to the axis of symmetry of the shaft, so as they force the scavenging air to enter the engine combustion chamber tangentially. Thanks to this arrangement, the shape of the combustion chamber and specific placement of inlet and outlet ports in this engine promote creation of air swirl.

Figure 15:
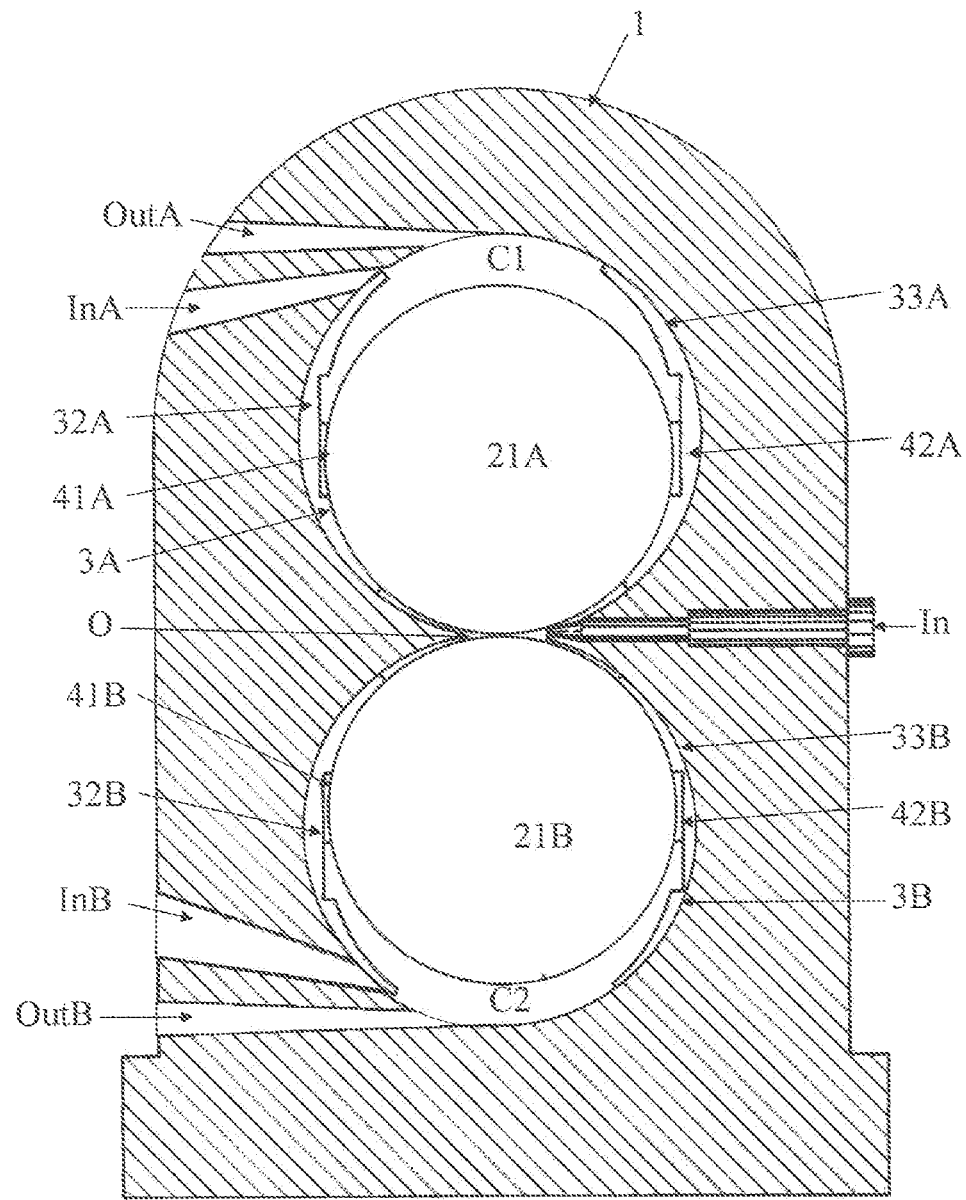
FIG. 15 is a transverse cross-section of a rotary analogue of the opposed piston engine according to the present invention.
Figure 16:
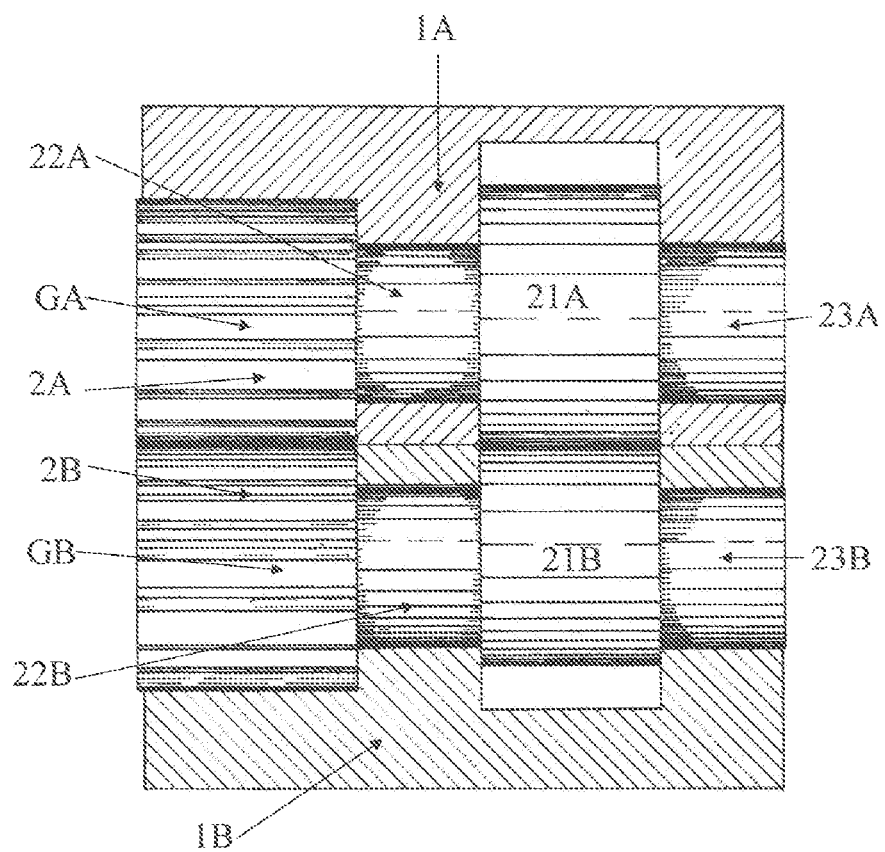
FIG. 16 is a longitudinal cross-section of the rotary analogue of the opposed piston engine.

Yet another rotary engine according to the present invention, namely a rotary analogue of the opposed-piston engine, is shown in a transverse and longitudinal cross-sections in FIGS. 15 and 16 respectively. The main idea behind this design is to minimize the area/volume ratio of combustion chamber, in order to improve thermal efficiency of the engine (like in ordinary opposed-piston engines). Thus the engine includes a body 1 divided into two halves 1A and 1B in order to enable assemble/disassemble of the engine. Placed in the half-body 1A there is a first working chamber or cylinder C1; similarly, placed in the half-body 1B there is a second cylinder C2; both the working chambers C1 and C2 are connected by an orifice O. Bearing in the component 1A of the engine body 1 there is an eccentric shaft 2A having two main journals 22A and 22A, an eccentric 21A, and a first gear (toothed wheel) GA. Similarly, rotatably supported in the component 1B of the engine body 1 there is an eccentric shaft 2B having two main journals 22B and 22B, an eccentric 21B, and a first gear (toothed wheel) GB. The gear GA meshes with the gear GB, providing synchronizing means for the engine shafts 2A and 2B. Positioned between the eccentrics 21A and 21B there is a common combustion chamber C. The eccentric 21A of the shaft 2A is sealed in the engine cylinder C1 using primary 3A and secondary 41A, 42A sealing elements precisely the same as those described above; similarly, the eccentric 21B of the shaft 2B is sealed in the engine cylinder C2 using primary 3B and secondary 41B, 42B sealing elements.

Figure 17:
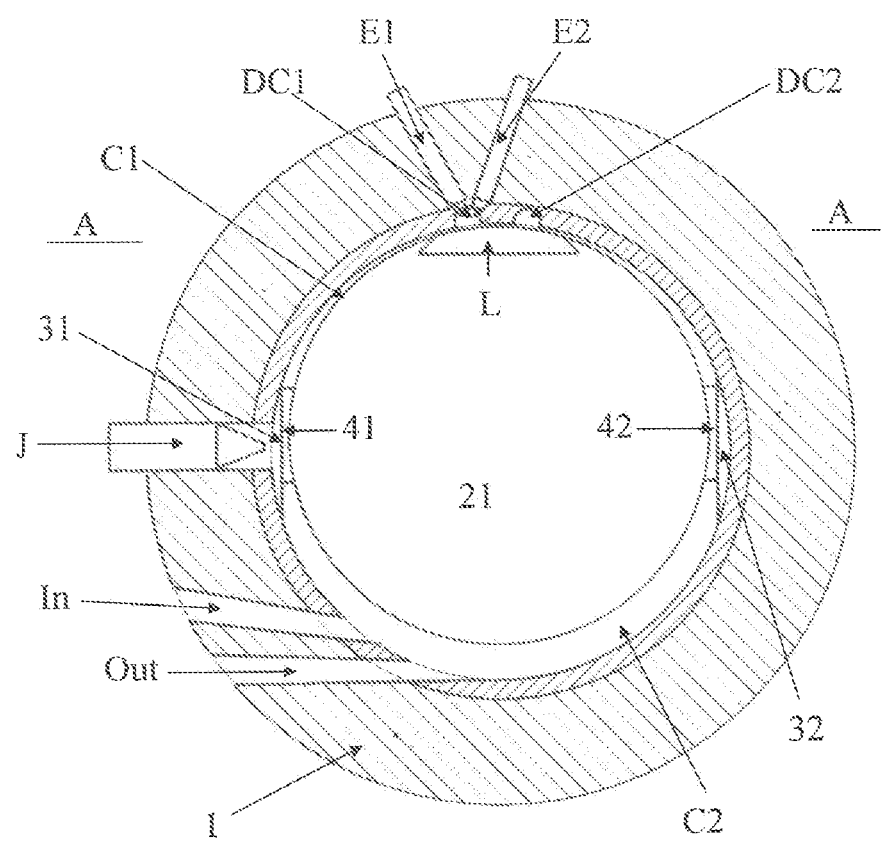
FIG. 17 is a transverse cross-section of a detonation engine according to the present invention.
Figure 18:
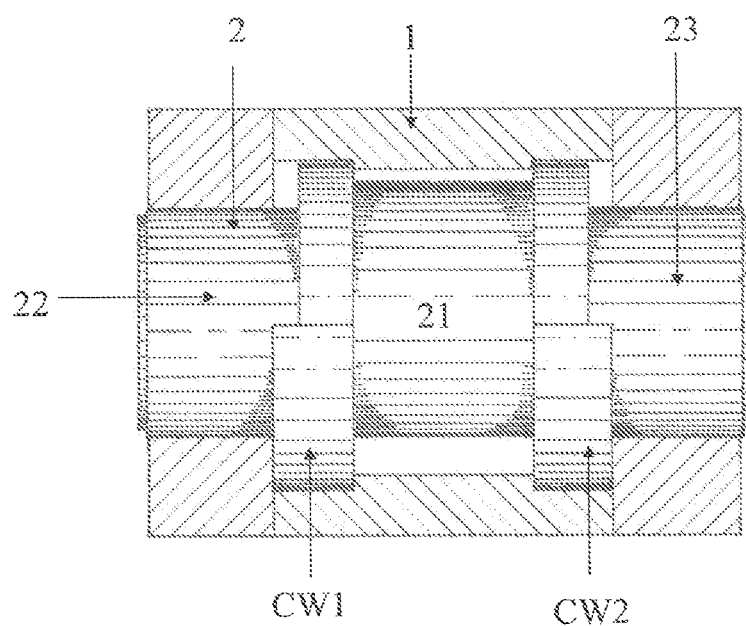
FIG. 18 is a longitudinal cross-section of the detonation engine according to the present invention.
Figure 19:
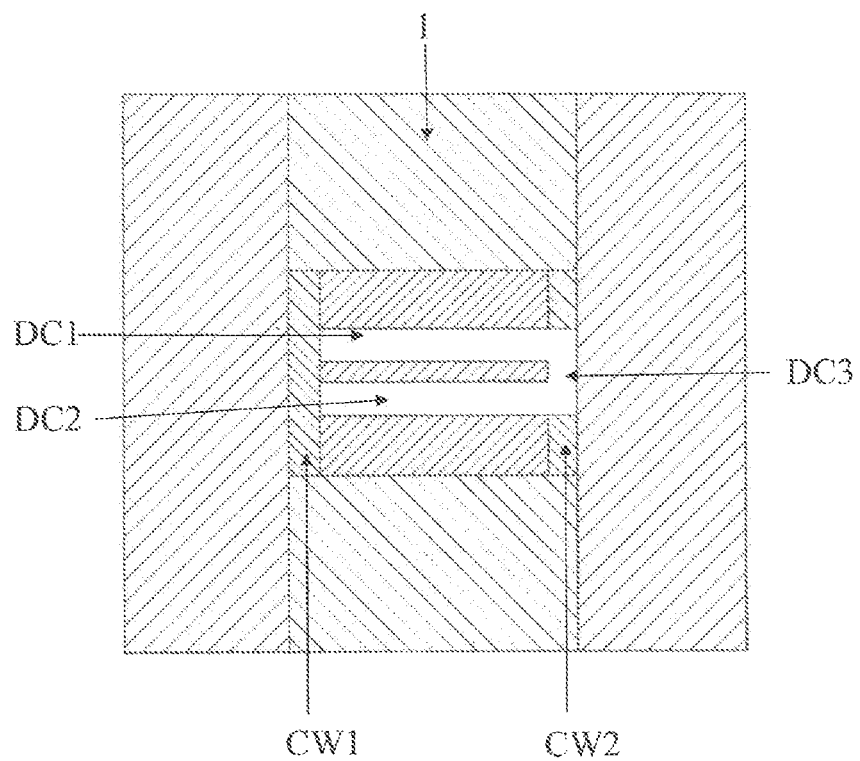
FIG. 19 is a section A-A of the detonation engine according to the invention indicated in FIG. 17.

One more preferred embodiment of the present invention is a rotary detonation engine shown in FIGS. 17, 18, 19. It shares the general layout of the first preferred embodiments described above. Thus the engine includes a body 1 and an eccentric shaft 2 mounted rotatably in said body 1, with eccentric 21 sealed in the body 1 with the help of the primary 31, 32 and secondary 41, 42 sealing elements, in exactly the same way as set forth above. Placed in the engine body 1 there is a long and narrow detonation chamber, which consists of two segments DC1, DC2, interconnected by a passage DC3 placed in an element CW2 of the shaft 2. The segment DC1 of the detonation chamber may be a deflagration-to-detonation zone, however in the case a sufficiently powerful ignition apparatus is applied capable to directly initiate detonation, both the segments DC1, DC2 of the detonation chamber may be a detonation zone. The purpose of applying two-segment detonation chamber is to ensure sufficient length of the detonation chamber in order to facilitate detonation; obviously a straight one-segment detonation chamber is also applicable to this engine, assuming the length of the eccentric 21 is sufficiently large. An ignition apparatus consisting of two electrodes E1, E2 placed in the body 1, preferably made of tungsten, and a suitable source of electric power (not shown) is applied in this engine. Arranged on the shaft 1, where it is contacted with the detonation wave, is liner L, preferably made of a very high strength and very high hardness steel or tungsten carbide. Placed on the shaft 2 there are also two counterweights CW1, CW2 which balance the centrifugal force generated by the eccentric 21.

Figure 20:
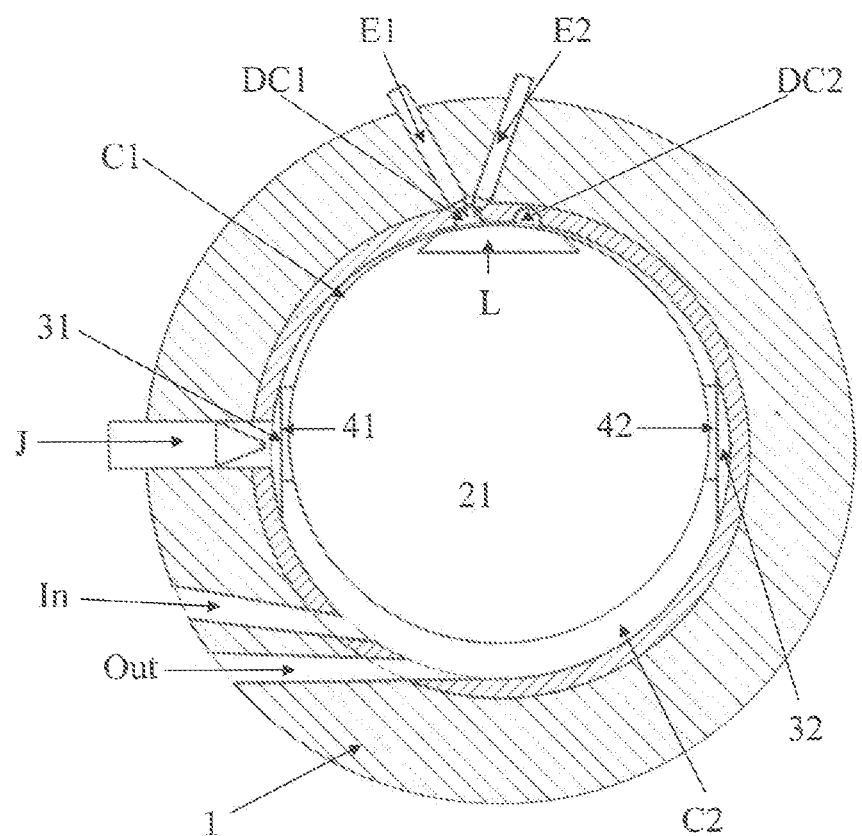
FIG. 20 is a transverse cross-section of another variant of the detonation rotary engine of the present invention.

FIG. 20 shows another variant of the detonation rotary engine. It shares all features with the detonation rotary engine previously described, the only difference being the detonation chamber DC placed in the eccentric 21 of the eccentric shaft 2, as shown in FIG. 20.

Figure 21:
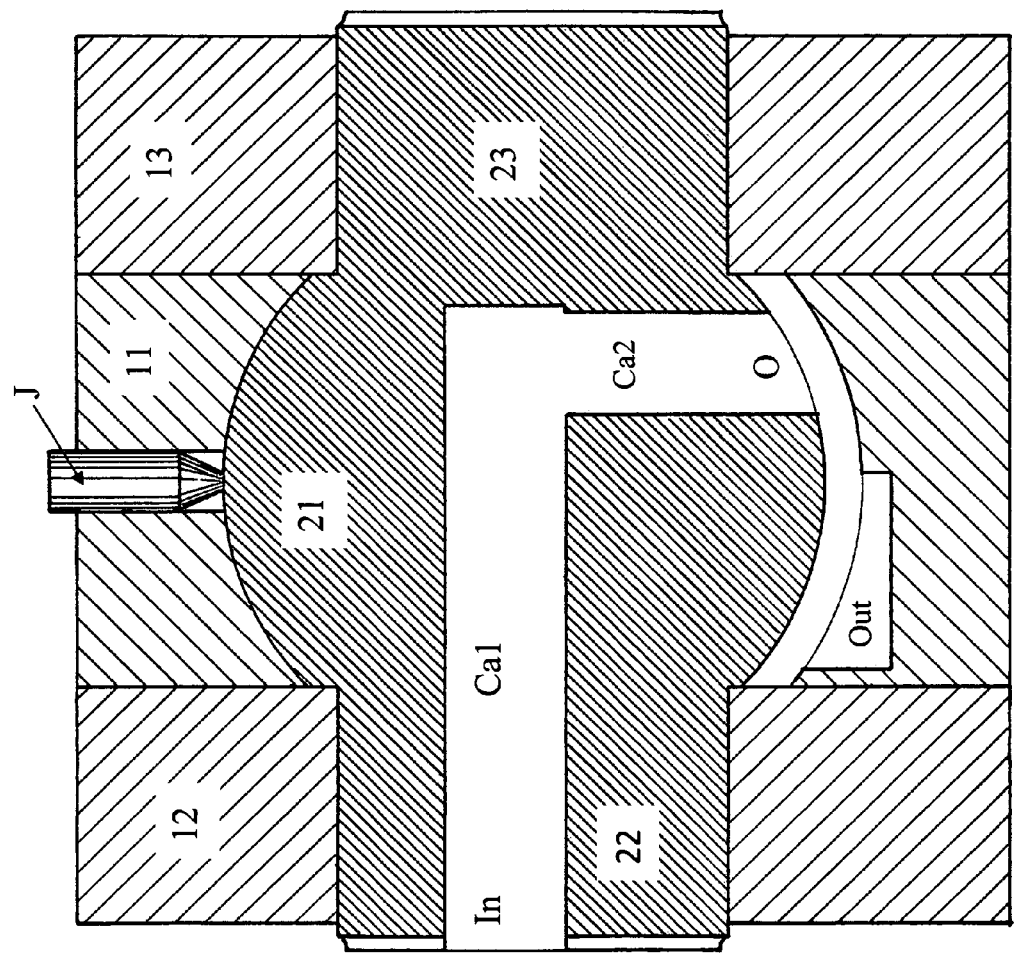
FIG. 21 is a longitudinal cross-section of the engine according to the present invention with a different scavenging system.

Another engine embodying the present invention is shown in a longitudinal cross-section in FIG. 21. It shares the general layout and transverse cross-sections with the engines described above. The principal novel feature is differently designed scavenging system, and different means for balancing the engine. Namely, a fresh air canal Ca1 is formed in the shaft 2. The canal Ca1 includes an air inlet port In at its one end, and is terminated with a canal Ca2 perpendicular to the canal Ca1; the canal C2 in turn is terminated with an air outlet port O, so that both the canals Ca1 and Ca2 provide fluidic communication between the working chamber of the engine and atmosphere. During the scavenging stroke the fresh air enters the engine through the inlet In, then, driven by centrifugal forces, flows through the canals Ca1 and Ca2, and displaces combustion gases from the combustion chamber. The canal Ca2 serves also as means for balancing the mass forces generated by the spherical eccentric 21.

It will be obvious to those skilled in the art that various features of the five engines described above can be combined in one design.

Now a description of work of all the first four engines being the first four preferred embodiments of the invention follows (see FIGS. 1-4 presenting subsequent positions of the engines parts during work cycle). The engines operate on the two stroke Diesel-Atkinson/Miller cycle. In the position illustrated in FIG. 1 volume of the combustion chamber C1 assumes its minimum, a fuel, e.g. pulverized coal, is being injected into said combustion chamber C1 and self-ignited, and power stroke commences in the combustion chamber C1; volume of the combustion chamber C2 assumes its maximum, the primary sealing element 3 includes just opened the outlet ports Out, hot combustion gases are being exited from the combustion chamber C2 through outlet ports Out, and scavenging of said combustion chamber commences. As the engine shaft 2 and the primary sealing element 3 rotate, the combustion chamber C1 expands producing useful power, combustion chamber C2 contracts, and the engine moving elements assume position the position illustrated in FIG. 2. The primary sealing element 3 includes opened the inlet ports In, fresh air is being pumped into the combustion chamber C2, and hot combustion gases are being expelled blowing out unburned solid particles from the ashpan Asp.

Figure 3:
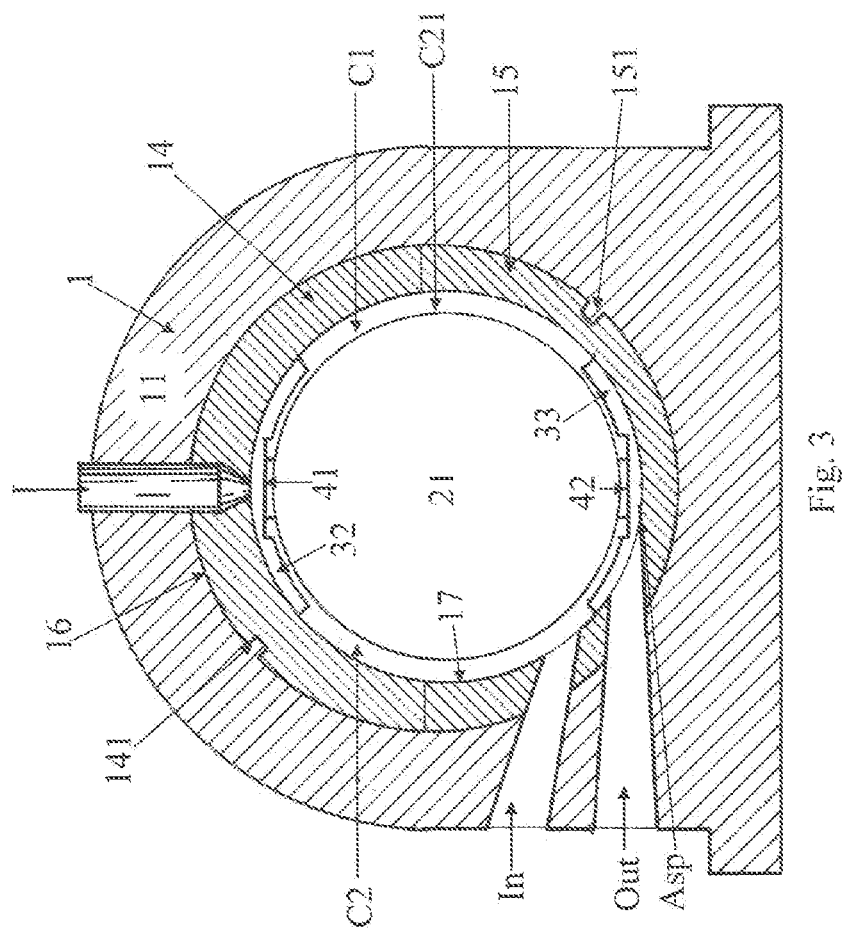
FIG. 3 is yet another transverse cross-section taken at a line B-B (see FIG. 6) of the engine being the first preferred embodiment of the invention, showing positions of the engine parts at yet another stage of work cycle.

As the engine shaft and the primary sealing element 3 further rotate the engine elements assume the position illustrated in FIG. 3. The combustion chamber 2 further expands producing useful, the combustion chamber C2 further contracts, while the primary sealing element 3 closes outlet ports Out leaving inlet ports In open, thus allowing fresh air filling the combustion chamber C2 to flow back from said combustion chamber to the atmosphere.

Figure 4:
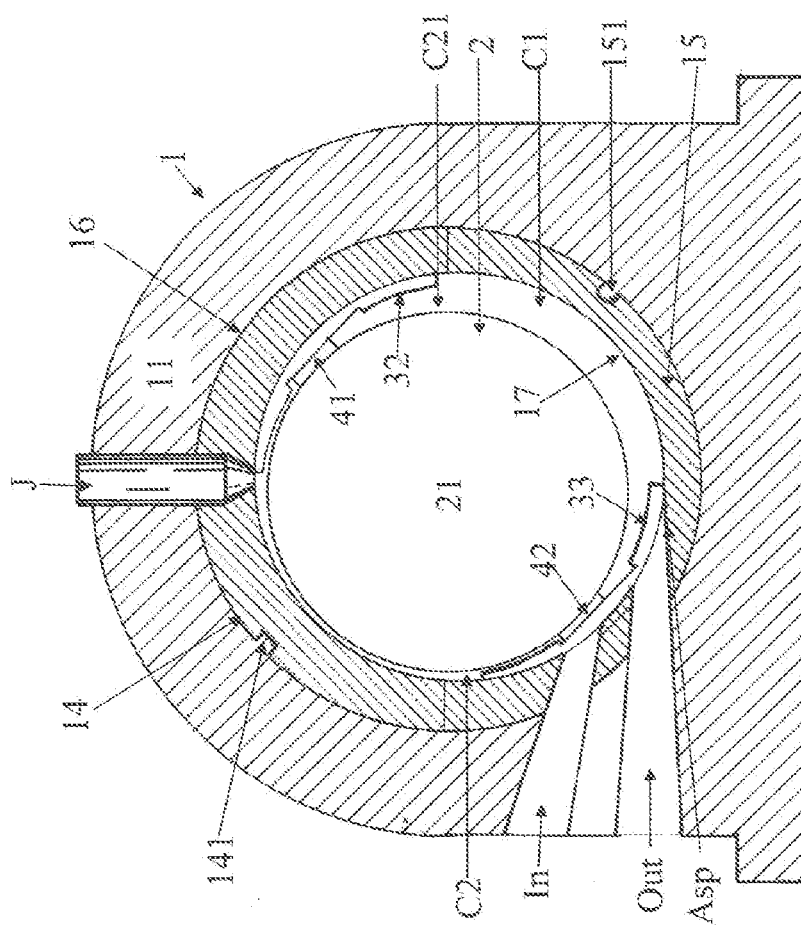
FIG. 4 is one more transverse cross-section taken at a line A-A (see FIG. 6) of the engine being the first preferred embodiment of the invention, showing positions of the engine parts at yet another stage of work cycle.
Figure 5:
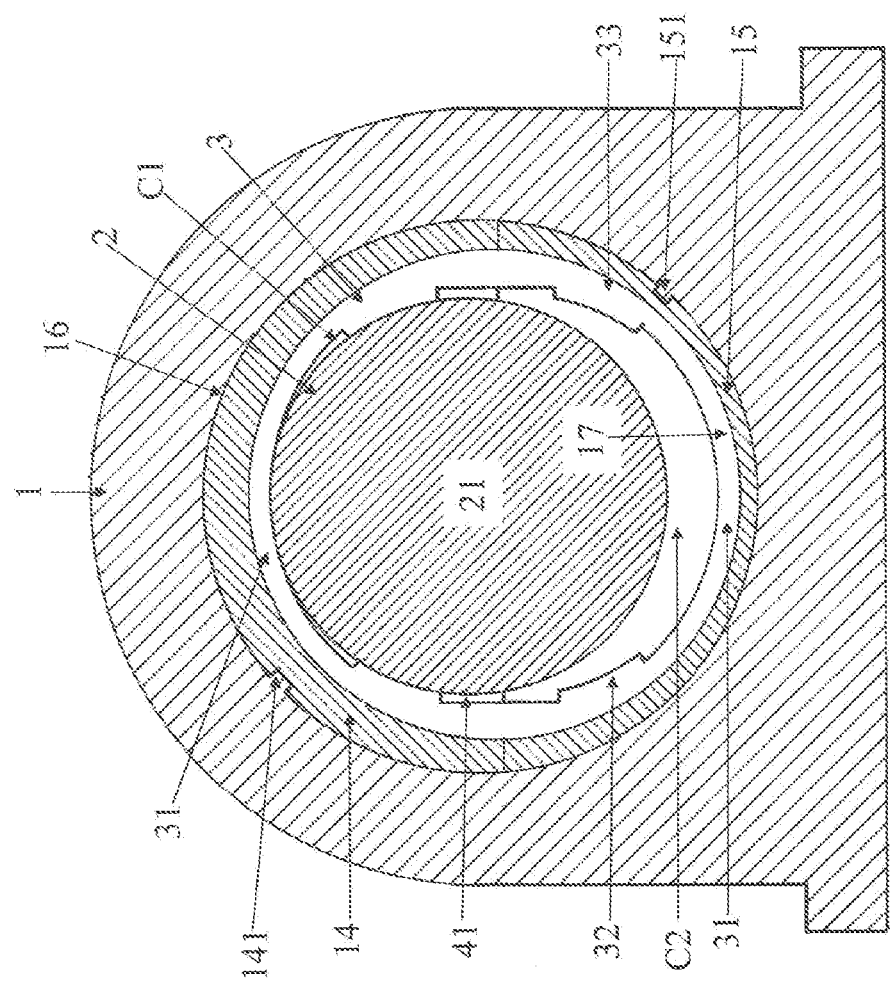
FIG. 5 is a transverse cross-section taken at a line B-B (see FIG. 6) of the engine being the first preferred embodiment of the invention, showing positions of the engine parts at some other stage of work cycle.
Figure 6:
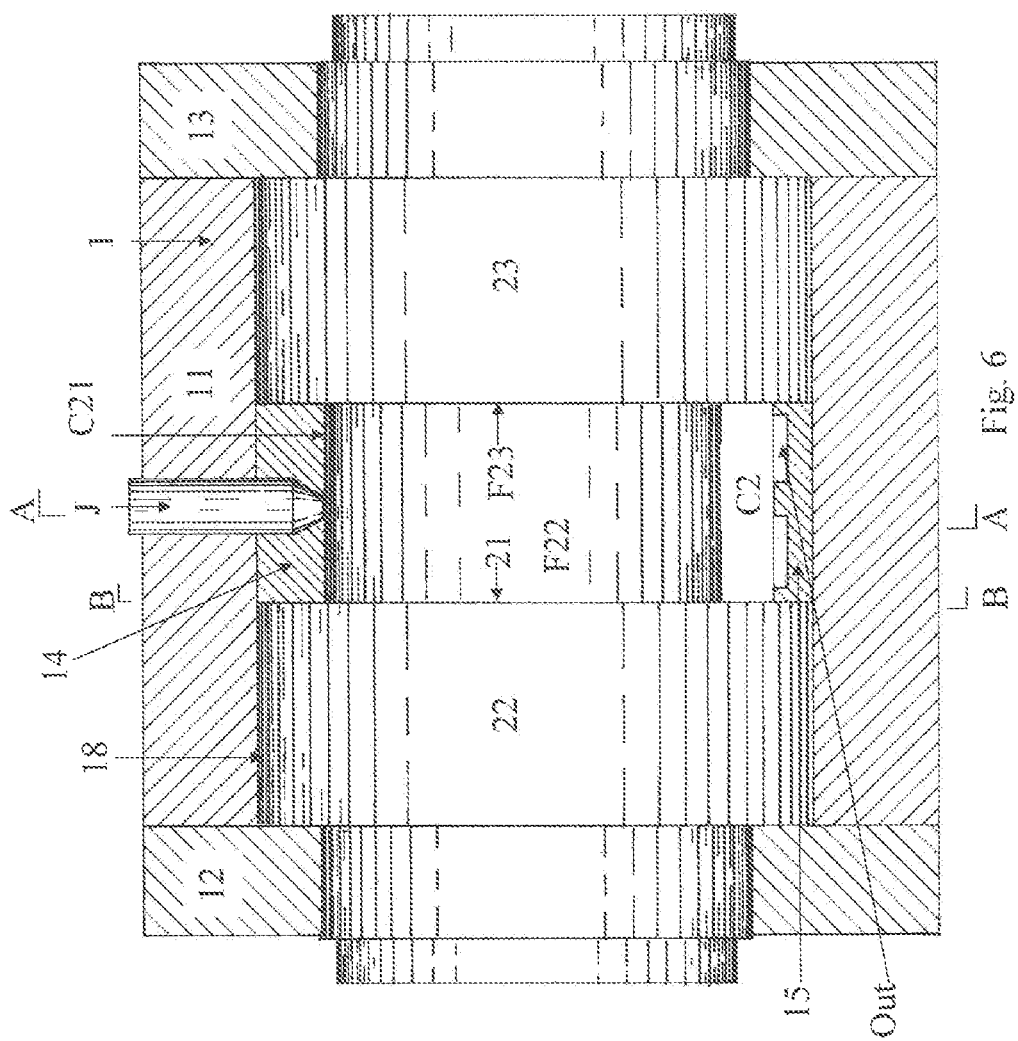
FIG. 6 is a longitudinal cross-section of the engine being the first preferred embodiment of the invention.
Figure 7:
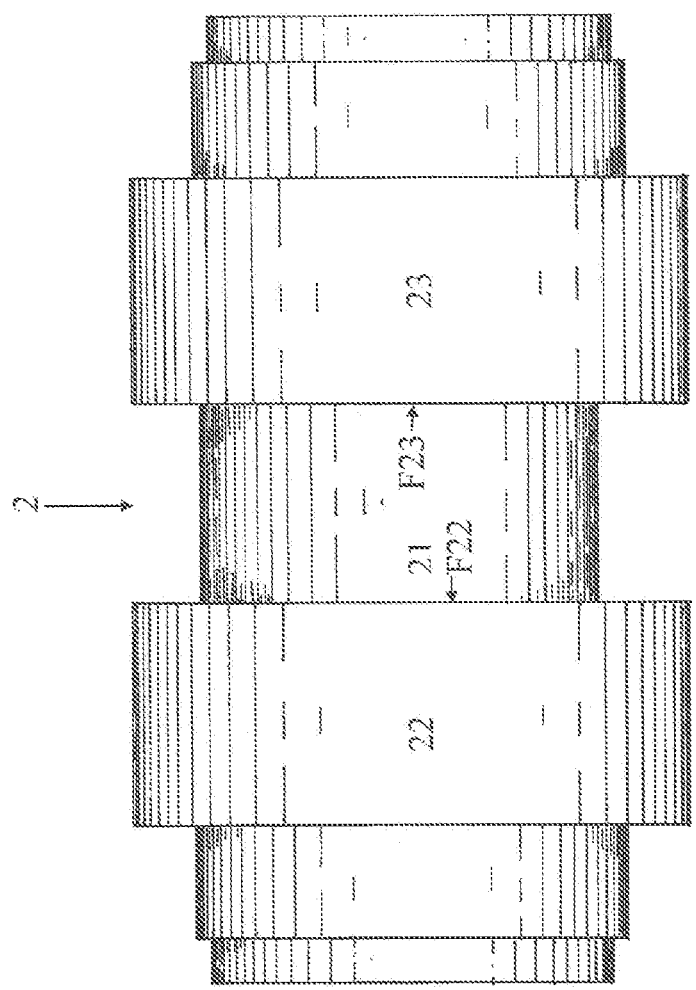
FIG. 7 is a general view of the shaft of the engine being the first preferred embodiment of the invention.

As the engine shaft and the primary sealing element 3 rotate still further, the engine elements assume the position shown in FIG. 4. Volume of the combustion chamber C1 approaches its maximum, and the power stroke conducted in this chamber nears its end. The primary sealing element 3 includes closed the inlet port In, and the compression stroke is being conducted in the combustion chamber C2

By consulting FIGS. 1-4 it can be easily observed that compression of fresh air in this engine is carried out in substantially smaller volume that the volume, in which expansion of combustion gases occurs, thus allowing the engine of the present invention to be a naturally two stroke, valve-less, Atkinson/Miller-cycle engine. Moreover, it is clear that the overexpansion ratio of the engine of the present invention can be fixed by determining position of the inlet ports In relative the outlet ports Out. It can be also seen that expelling unburned solid particles from the engine combustion chambers is very efficient, unlike in conventional piston engines, as these particles, which are not suspended in combustion gases and thus immediately expelled from the combustion chamber, are collected in the ashpan placed at the bottom of the engine cylinder in immediate proximity to the outlet port, and are expelled from the combustion chamber subsequently.

A further important observation is that the power stroke of each combustion chamber of the engine of the present invention extends over the full revolution of the engine shaft 2, which substantially contributes to improving torque smoothness, particularly of an engine with few combustion chambers.

It should be also observed that the engine being the second preferred embodiment of the invention, due to the specific pincludesing of the eccentrics of its shaft and its cylinders described above, fires only once during each revolution of its shaft, despite having eight combustion chambers (two combustion chambers per each shaft eccentric); thus torque smoothness of this engine is the same as that of the previous engine. However, the engine is naturally perfectly dynamically balanced, and the resultant gas force loading the shaft 2 bearings is nullified, thus dramatically decreasing friction losses and improving engine's overall efficiency. Torque smoothness of the engine can be improved without scarifying these two extremely important advantages by applying a larger number of assemblies of four cylinders and four eccentrics constructed as described above.

Figure 8:
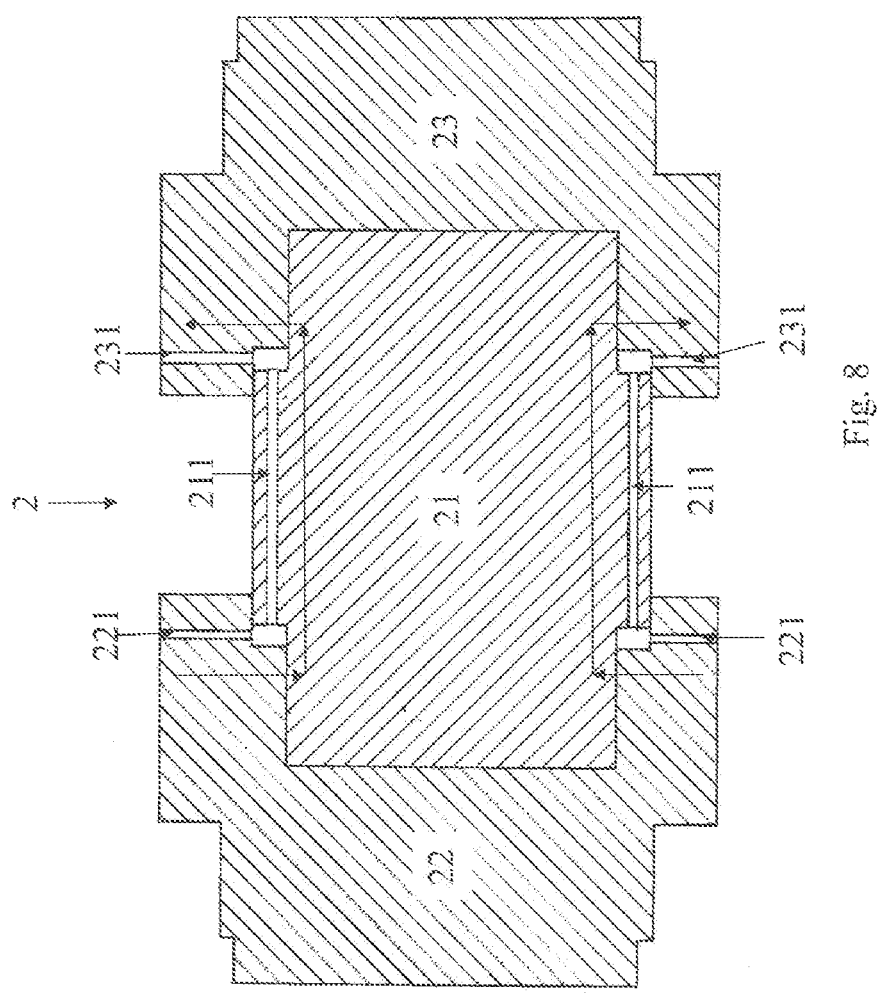
FIG. 8 is a longitudinal cross-section of the shaft of the engine being the first preferred embodiment of the invention, showing some details of the engine cooling system

Hot combustion gases act directly upon the engine eccentric shaft 2, so it must be cooled. The cooling system of the shaft eccentric 21 and the shaft pins 22 and 23 is shown in FIG. 8. The cooling system consists of radial conveyances 221 and 231 placed in the pins 22 and 23, and axial conveyances 211 placed in the eccentric 21. A cooling medium, e.g. a lubricating oil enters the conveyances 221 in the pin 22, then flows through the conveyances 211, and finally through the conveyances 231, as shown in FIG. 8.

It is to be stressed that sufficiently quick release of thermal energy in the engine cylinder during the combustion pincludese of power strokes must be assured, in order to achieve large rotational speed. This can be achieved by utilizing a very high compression ratio and thus very high compression temperatures of air into which fuel is being injected at the beginning of power stroke, together with very high fuel injection pressures. A suitable effective fuel injection apparatus capable of delivering solid particle fuel at very high pressures is proposed for application in the engine of the present invention. However, such a fuel injection apparatus and method is not an intrinsic part of this invention, so I will touch upon this problem in more detail in a separate patent application. Another method for achieving very high rate of thermal energy release suitable for the engine of the present invention is to apply HCCI or detonation combustion.

Essentially the same discussion applies to the fifth preferred embodiment of the present invention, namely the detonation engine. The only differences are that fuel is injected into a combustion chamber well before its volume achieves minimum in order to allow of formation of homogeneous charge, and the homogeneous charge is ignited by the ignition apparatus E1, E2 as volume of the combustion chamber attains minimum, thus initiating deflagration to detonation transition, or directly detonation if energy provided by the ignition apparatus is sufficiently large.

Exceptionally robust structure of the engine of the instant invention renders it particularly well suited for applying very high in-cylinder pressures. Moreover, possibility of preventing bearings from being loaded by gas forces offered by the engine of the present invention and absence of hot load bearing elements make applying very high compression ratio and in-cylinder pressures a sensible expedient for substantially increasing overall efficiency of the engine (in a sharp contrast with conventional engines), as it is not accompanied by increase of in-bearing friction losses. Moreover, natural dynamic balance of the engine of the present invention, where all mass forces are kept within the engine shaft and do not load engine's bearings, allows for applying very high rotational speeds, thus allows for achieving very large power now attainable only by largest steam turbines, and very good power/volume and power/weight ratios typical for gas turbines.

One skilled in the art will readily recognize from this description and from the accompanying figures and patent claims, that many changes and modifications can be made to the presented preferred embodiments without departing from the true spirit, scope and nature of the inventive concepts as defined in the appended patent claims.

I claim:

1. A rotary internal combustion engine comprising:
an engine body, wherein said engine body includes at least one bearing and at least one circular working chamber including a circular inner wall;
wherein said at least one bearing includes a first axis of symmetry;
wherein said inner wall of said at least one circular working chamber assumes the shape of a first surface of revolution, and includes a second axis of symmetry, wherein the second axis of symmetry of said at least one circular working chamber is parallel to said first axis of symmetry of said at least one bearing, and the second axis of symmetry of the inner wall of said at least one circular working chamber is displaced relative said first axis of symmetry of said at least one bearing by a distance d>0;
wherein a plurality of inlet ports for supplying fresh air to said at least one circular working chamber and a plurality of outlet ports for venting exhaust gases from said at least one circular working chamber are placed in said engine body, so that said inlet ports and said outlet ports provide fluidic communication between said at least one circular working chamber and atmosphere;
wherein at least one fuel injector is mounted in said engine body in proximity to said at least one circular working chamber;
at least one eccentric shaft, wherein said at least one eccentric shaft includes at least one main pin, and at least one eccentric;
wherein said at least one main pin of the at least one eccentric shaft includes a third axis of symmetry;
wherein said at least one eccentric of the at least one eccentric shaft assumes the shape of a first solid of rotation, and includes a fourth axis of symmetry; wherein said fourth axis of symmetry of said at least one eccentric of said at least one eccentric shaft is parallel to said third axis of symmetry of said at least one main pin of said at least one eccentric shaft, and said fourth axis of symmetry of said at least one eccentric of said at least one eccentric shaft is displaced relative said third axis of symmetry of said at least one main pin of said at least one eccentric shaft by the distance d>0; wherein said at least one main pin of said at least one eccentric shaft is mounted rotatably in said at least one bearing placed in the engine body, so that the first axis of symmetry of said at least one bearing coincides with said third axis of symmetry of said at least one main pin of said at least one eccentric shaft and defines an axis of rotation of said at least one eccentric shaft relative the engine body, so that said engine body and said at least one eccentric shaft form a first rotary kinetic couple, and the at least one circular working chamber circular inner wall encompasses said at least one eccentric of said at least one eccentric shaft, so that combustion gases exert force directly on said at least one eccentric of the at least one eccentric shaft;
at least one primary sealing element including a ring-shaped part and at least a first sealing bar projecting from said ring-shaped part of said at least one primary sealing element, and a second sealing bar projecting from said ring-shaped part of said at least one primary sealing element; wherein said first sealing bar includes a first circular surface and a first flat surface, and said second sealing bar includes a second circular surface and a second flat surface; wherein said at least one primary sealing element is mounted rotatably in said at least one circular working chamber placed in the engine body, such that said first circular surface of said first sealing bar slides over said inner wall of said at least one circular working chamber, and said second circular surface of said second sealing bar slides over said inner wall of said at least one circular working chamber, so that said at least one primary sealing element and the engine body form a second rotary kinetic couple;
at least a first secondary sealing element, and a second secondary sealing element, wherein said first secondary sealing element includes a third flat surface and a third circular surface, and said second secondary sealing element includes a fourth flat surface and a fourth circular surface; wherein said first secondary sealing element is mounted inside said at least one circular working chamber, such that said third flat surface of said first secondary sealing element slides over said first flat surface of said first sealing bar projecting from said ring-shaped part of said at least one primary sealing element, and said third circular surface of said first secondary sealing element slides over said at least one eccentric of said at least one eccentric shall, and said fourth flat surface of said second secondary sealing element slides over said second flat surface of said second sealing bar projecting from said ring-shaped part of said at least one primary sealing element, and said fourth circular surface of said second secondary sealing element slides over said at least one eccentric of said at least one eccentric shaft, so that said at least one eccentric of the at least one eccentric shaft, said first sealing bar projecting from said ring-shaped part of said at least one primary sealing element and said first secondary sealing element, and said second sealing bar projecting from said ring-shaped part of said at least one primary sealing element and said second secondary sealing element divide said at least one circular working chamber into two gas-tight combustion chambers;
wherein said first secondary sealing element and said second secondary sealing element move in unison, wherein said first secondary sealing element and said second secondary sealing element form with the at least one eccentric shaft a third rotary kinetic couple, and said first secondary sealing element and said second secondary sealing element form with said at least one primary sealing element a sliding kinetic couple; wherein an assembly of the engine body, the at least one eccentric shaft, the at least one primary sealing element, and a pair of the first secondary sealing element and said second secondary element form a four-bar linkage including the three rotary kinetic couples and the sliding kinetic couple.

2. The rotary internal combustion engine according to claim 1, wherein said inlet ports for supplying fresh air to said at least one circular working chamber have inlet ports openings placed in the inner wall of said at least one circular working chamber, and said outlet ports for venting exhaust gases from said at least one circular working chamber have outlet ports openings placed in said inner wall of said at least one circular working chamber, wherein said inlet ports openings are positioned at a non-zero angle relative said outlet ports openings, so that a power stroke of the engine extends over a first angle of revolution of the engine at least one eccentric shaft, and a compression stroke of the engine extends over a second angle of revolution of the engine at least one eccentric shaft, and said first angle of revolution of the engine at least one eccentric shaft is larger than said second angle of revolution of the engine at least one eccentric shaft, so that an expansion volume of the power stroke of the engine is larger than a compression volume of the compression stroke of the engine.

3. The rotary internal combustion engine according to claim 1, wherein said engine body includes at least the first circular working chamber including the first circular inner wall, a second circular working chamber including a second circular inner wall, a third circular working chamber including a third circular inner wall, and a fourth circular working chamber including a fourth circular inner wall, wherein said at least one eccentric shaft includes at least the first eccentric, a second eccentric, a third eccentric, and a fourth eccentric; wherein said at least one eccentric shaft is mounted rotatably in said engine body so that said first circular working chamber first circular inner wall encompasses said first eccentric, said second circular working chamber second circular inner wall encompasses said second eccentric, said third circular working chamber third circular inner wall encompasses said third eccentric, and said fourth circular working chamber fourth circular inner wall encompasses said fourth eccentric; wherein said second eccentric and said third eccentric are positioned between said first eccentric and said fourth eccentric; wherein said first eccentric includes a fifth axis of symmetry parallel to said axis of rotation of said at least one eccentric shaft relative the engine body, said second eccentric includes a sixth axis of symmetry parallel to said axis of rotation of said at least one eccentric shaft relative the engine body, said third eccentric includes a seventh axis of symmetry parallel to said axis of rotation of said at least one eccentric shaft relative the engine body, and said fourth eccentric includes an eighth axis of symmetry parallel to said axis of rotation of said at least one eccentric shaft relative the engine body; wherein said first eccentric fifth axis of symmetry coincides with said fourth eccentric eighth axis of symmetry, and said second eccentric sixth axis of symmetry coincides with said third eccentric seventh axis of symmetry; wherein said first eccentric fifth axis of symmetry and said fourth eccentric eighth axis of symmetry are displaced relative the axis of rotation of said at least one eccentric shaft relative the engine body by the distance d>0, and said second eccentric sixth axis of symmetry and said third eccentric seventh axis of symmetry are displaced relative the axis of rotation of said at least one eccentric shaft relative the engine body by the distance d>0; wherein said first eccentric fifth axis of symmetry and said fourth eccentric eighth axis of symmetry are rotated about the axis of rotation of said at least one eccentric shaft relative said second eccentric sixth axis of symmetry and said third eccentric seventh axis of symmetry by 180 degrees, so that the resulting mass force and the resulting moment of mass forces generated by the first eccentric, the second eccentric, the third eccentric, and the fourth eccentric are nullified, and so that the resulting gas force acting upon the at least one eccentric shaft is nullified.

4. The rotary internal combustion engine according to claim 1, wherein said engine body includes at least the first circular working chamber including the first circular inner wall, a second circular working chamber including a second circular inner wall, and a third circular working chamber including a third circular inner wall, wherein said at least one eccentric shaft includes the first eccentric, a second eccentric, and a third eccentric, wherein said at least one eccentric shaft is mounted rotatably in said engine body so that said first circular working chamber first circular inner wall encompasses said first eccentric, said second circular working chamber second circular inner wall encompasses said second eccentric, and said third circular working chamber third circular inner wall encompasses said third eccentric; wherein said second eccentric is positioned between said first eccentric and said third eccentric, wherein said first eccentric includes a fifth axis of symmetry parallel to said axis of rotation of said at least one eccentric shaft relative the engine body, said second eccentric includes a sixth axis of symmetry parallel to said axis of rotation of said at least one eccentric shaft relative the engine body, and said third eccentric includes a seventh axis of symmetry parallel to said axis of rotation of said at least one eccentric shaft relative the engine body; wherein said first eccentric fifth axis of symmetry coincides with said third eccentric seventh axis of symmetry; wherein said first eccentric fifth axis of symmetry and said third eccentric seventh axis of symmetry are displaced relative the axis of rotation of said at least one eccentric shaft relative the engine body by the distance d>0, and said second eccentric sixth axis of symmetry is displaced relative the axis of rotation of said at least one eccentric shaft relative the engine body by the distance d>0; wherein said first eccentric fifth axis of symmetry and said third eccentric sixth axis of symmetry are rotated about the axis of rotation of said at least one eccentric shaft relative to said second eccentric sixth axis of symmetry by 180 degrees; wherein an average radius of said first eccentric equals an average radius of said third eccentric, and a length of the first eccentric measured along the axis of rotation of said at least one eccentric shaft relative the engine body equals a length of the third eccentric measured along the axis of rotation of said at least one eccentric shaft relative the engine body, and an average radius of the second eccentric equals two to the power of one fourth times the average radius of the first eccentric, and a length of the second eccentric measured along the axis of rotation of said at least one eccentric shaft relative the engine body equals two to the power of half times the length of the first eccentric measured along the axis of rotation of said at least one eccentric shaft relative the engine body, so that the resulting mass force and the resulting moment of mass forces generated by the first eccentric, the second eccentric, and the third eccentric are nullified, and so that the resulting gas force acting upon the at least one eccentric shaft is nullified.

5. The rotary internal combustion engine according to claim 1, wherein said engine includes at least the first eccentric shaft including at least the first eccentric, and a second eccentric shaft including at least a second eccentric; wherein said engine body includes at least the first circular working chamber including the first circular inner wall, and a second circular working chamber including a second circular inner wall; wherein said first eccentric shaft is mounted rotatably in the engine body so that said first circular working chamber first circular inner wall encompasses said first eccentric shaft first eccentric, and said second circular working chamber second circular inner wall encompasses said second eccentric shaft second eccentric; wherein an orifice is placed in said engine body so that said orifice provides a fluidic communication between said first circular working chamber and said second circular working chamber, to minimize an area/volume ratio of the first circular working chamber and the second circular working chamber.

6. The rotary internal combustion engine according to claim 1, wherein said engine is fueled by a solid particulate fuel.

7. The rotary internal combustion engine according to claim 6, wherein said solid particulate fuel is coal dust.

8. The rotary internal combustion engine according to claim 1, wherein a detonation chamber is placed in said engine body; wherein at least two electrodes are placed in proximity to said detonation chamber; wherein said rotary internal combustion engine is a detonation engine.

9. The rotary internal combustion engine according to claim 1, wherein a detonation chamber is placed in said at least one eccentric of said at least one eccentric shall; wherein at least two electrodes are placed in proximity to said detonation chamber; wherein said rotary internal combustion engine is a detonation engine.

10. The rotary internal combustion engine according to claim 1, wherein said at least one eccentric of said eccentric shaft includes the shape of a segment of ball bounded by two mutually parallel planes.

11. A rotary internal combustion engine comprising:
an engine body, wherein said engine body includes at least one bearing and at least one circular working chamber including an inner wall;
wherein said at least one bearing includes a first axis of symmetry;
wherein said inner wall of said at least one circular working chamber assumes the shape of a first surface of revolution, and includes a second axis of symmetry, wherein the second axis of symmetry of said at least one circular working chamber is parallel to said first axis of symmetry of said at least one bearing, and the second axis of symmetry of the inner wall of said at least one circular working chamber is displaced relative said first axis of symmetry of said at least one bearing by a distance d>0;
wherein a plurality of outlet ports for venting exhaust gases from said at least one circular working chamber are placed in said engine body, so that said outlet ports provide fluidic communication between said at least one circular working chamber and atmosphere;
wherein at least one fuel injector is mounted in said engine body in proximity to said at least one circular working chamber;
at least one eccentric shaft, wherein said at least one eccentric shaft includes at least one main pin, and at least one eccentric;
wherein said at least one main pin of the at least one eccentric shaft includes a third axis of symmetry;
wherein said at least one eccentric of the at least one eccentric shaft assumes the shape of a first solid of rotation, and includes a fourth axis of symmetry; wherein said fourth axis of symmetry of said at least one eccentric of said at least one eccentric shaft is parallel to said third axis of symmetry of said at least one main pin of said at least one eccentric shaft, and said fourth axis of symmetry of said at least one eccentric of said at least one eccentric shaft is displaced relative said third axis of symmetry of said at least one main pin of said at least one eccentric shaft by the distance d>0; wherein said at least one main pin of said at least one eccentric shaft is mounted rotatably in said at least one bearing placed in the engine body, so that the first axis of symmetry of said at least one bearing coincides with said third axis of symmetry of said at least one main pin of said at least one eccentric shaft and defines an axis of rotation of said at least one eccentric shaft relative the engine body, so that said engine body and said at least one eccentric shaft form a first rotary kinetic couple, and the at least one circular working chamber circular inner wall encompasses said at least one eccentric of said at least one eccentric shaft, so that combustion gases exert force directly on said at least one eccentric of the at least one eccentric shaft; wherein said at least one eccentric shaft includes a main air canal and a secondary air canal, wherein said main air canal includes an air inlet port placed in said at least one main pin of said at least one eccentric shaft, wherein said secondary air canal includes an air outlet port placed in said at least one eccentric of said at least one eccentric shaft, wherein said main air canal is in fluidic communication with said secondary air canal, so that said air inlet port, said main air canal, said secondary air canal, and said air outlet port provide fluidic communication between said at least one circular working chamber and atmosphere;

at least one primary sealing element including a ring-shaped part and at least a first sealing bar projecting from said ring-shaped part of said at least one primary sealing element, and a second sealing bar projecting from said ring-shaped part of said at least one primary sealing element; wherein said first sealing bar includes a first circular surface and a first flat surface, and said second sealing bar includes a second circular surface and a second flat surface; wherein said at least one primary sealing element is mounted rotatably in said at least one circular working chamber placed in the engine body, such that said first circular surface of said first sealing bar slides over said inner wall of said at least one circular working chamber, and said second circular surface of said second sealing bar slides over said inner wall of said at least one circular working chamber, so that said at least one primary sealing element and the engine body form a second rotary kinetic couple;

at least a first secondary sealing element, and a second secondary sealing element, wherein said first secondary sealing element includes a third flat surface and a third circular surface, and said second secondary sealing element includes a fourth flat surface and a fourth circular surface; wherein said first secondary sealing element is mounted inside said at least one circular working chamber, such that said third flat surface of said first secondary sealing element slides over said first flat surface of said first sealing bar projecting from said ring-shaped part of said at least one primary sealing element, and said third circular surface of said first secondary sealing element slides over said at least one eccentric of said at least one eccentric shaft, and said fourth flat surface of said second secondary sealing element slides over said second flat surface of said second sealing bar projecting from said ring-shaped part of said at least one primary sealing element, and said fourth circular surface of said second secondary sealing element slides over said at least one eccentric of said at least one eccentric shaft, so that said at least one eccentric of the at least one eccentric shaft, said first sealing bar projecting from said ring-shaped part of said at least one primary sealing element and said first secondary sealing element, and said second sealing bar projecting from said ring-shaped part of said at least one primary sealing element and said second secondary sealing element divide said at least one circular working chamber into two gas-tight combustion chambers;

wherein said first secondary sealing element and said second secondary sealing element move in unison, wherein said first secondary sealing element and said second secondary sealing element form with the at least one eccentric shaft a third rotary kinetic couple, and said first secondary sealing element and said second secondary sealing element form with said at least one primary sealing element a sliding kinetic couple; wherein an assembly of the engine body, the at least one eccentric shaft, the at least one primary sealing element, and a pair of the first secondary sealing element and said second secondary element form a four-bar linkage including the three rotary kinetic couples and the sliding kinetic couple.

* * * * *